US010656260B2

(12) United States Patent
Hammerschmidt et al.

(10) Patent No.: US 10,656,260 B2
(45) Date of Patent: *May 19, 2020

(54) METHODS AND APPARATUSES FOR SPEED AND/OR POSITION SENSING

(71) Applicant: Infineon Technologies AG, Neubiberg (DE)

(72) Inventors: Dirk Hammerschmidt, Finkerstein (AT); Farhan Bin Khalid, Unterhaching (DE); Frank Heinrichs, Villach (AT); Erich Kolmhofer, Linz (AT); Christof Michenthaler, Arnoldstein (AT); Andreas Miller, Taufkirchen (DE)

(73) Assignee: Infineon Technologies AG, Neubiberg (DE)

( * ) Notice: Subject to any disclaimer, the term of this patent is extended or adjusted under 35 U.S.C. 154(b) by 290 days.

This patent is subject to a terminal disclaimer.

(21) Appl. No.: 15/592,394

(22) Filed: May 11, 2017

(65) Prior Publication Data

US 2017/0336503 A1 Nov. 23, 2017

(30) Foreign Application Priority Data

May 18, 2016 (DE) .................. 10 2016 109 096
May 8, 2017 (DE) .................. 10 2017 109 861

(51) Int. Cl.
*G01S 13/58* (2006.01)
*H01Q 13/06* (2006.01)
(Continued)

(52) U.S. Cl.
CPC .............. *G01S 13/58* (2013.01); *G01S 13/42* (2013.01); *H01P 3/12* (2013.01); *H01P 5/107* (2013.01);
(Continued)

(58) Field of Classification Search
CPC ................................ G01S 13/58; G01S 13/42
See application file for complete search history.

(56) References Cited

U.S. PATENT DOCUMENTS 3,701,568 A * 10/1972 Lewis et al. ........ B60T 8/17633
303/182
4,507,658 A 3/1985 Keating
(Continued)

FOREIGN PATENT DOCUMENTS

CN 1491346 A 4/2004
CN 100375892 C 3/2008
(Continued)

OTHER PUBLICATIONS

German Patent Office, Office Action issued for DE102016109096.4, 10 pgs., dated Nov. 2, 2016.
(Continued)

*Primary Examiner* — Marcus E Windrich
(74) *Attorney, Agent, or Firm* — Schiff Hardin LLP

(57) ABSTRACT

Embodiments relate to machines including a movable part. A transmitter circuit is configured to generate a radio signal and to transmit the radio signal towards the movable part via a transmit waveguide. A reflection of the radio signal from the movable part is received by a receive waveguide and guided through the receive waveguide to a receiver circuit, which is configured to determine a position and/or a speed of the movable part based on at least the received radio signal. The transmitter circuit and the receiver circuit may be comprised by a radar sensor.

24 Claims, 23 Drawing Sheets

(51) Int. Cl.
*H01Q 13/02* (2006.01)
*H01P 5/107* (2006.01)
*G01S 13/42* (2006.01)
*H01P 3/12* (2006.01)
*H04B 1/40* (2015.01)
*G01S 7/02* (2006.01)

(52) U.S. Cl.
CPC ............ *H01Q 13/02* (2013.01); *H01Q 13/06* (2013.01); *H04B 1/40* (2013.01); *G01S 2007/027* (2013.01)

(56) References Cited

U.S. PATENT DOCUMENTS

| | | | |
|---|---|---|---|
| 5,760,731 | A | 6/1998 | Holmes |
| 8,817,483 | B2* | 8/2014 | Eckhardt ............... G01L 19/003 307/104 |
| 9,856,859 | B2* | 1/2018 | Vangen .................. F03D 17/00 |
| 2006/0158371 | A1 | 7/2006 | Duivenvoorden |
| 2008/0074307 | A1* | 3/2008 | Boric-Lubecke .... A61B 5/0205 342/28 |
| 2008/0195338 | A1 | 8/2008 | Geisheimer et al. |
| 2008/0224916 | A1* | 9/2008 | Takagi .................. G01S 7/4004 342/91 |
| 2013/0044020 | A1* | 2/2013 | Dvorkin .................. G01S 13/88 342/28 |
| 2015/0241555 | A1* | 8/2015 | Lin ....................... A61B 5/0205 702/56 |
| 2016/0240907 | A1* | 8/2016 | Haroun ................. G01S 13/931 |
| 2017/0222738 | A1* | 8/2017 | Hammerschmidt .... G01S 13/50 |

FOREIGN PATENT DOCUMENTS

| | | |
|---|---|---|
| CN | 101410700 A | 4/2009 |
| CN | 101416346 A | 4/2009 |
| CN | 102027337 A | 4/2011 |
| CN | 102865902 A | 1/2013 |
| CN | 103348529 A | 10/2013 |
| DE | 3225805 A1 | 1/1984 |
| DE | 102009016029 A1 | 10/2010 |
| WO | 2015094177 A1 | 6/2015 |

OTHER PUBLICATIONS

Office Action dated Apr. 9, 2019 issued for Chinese Patent Application No. 201710351967.8.

* cited by examiner

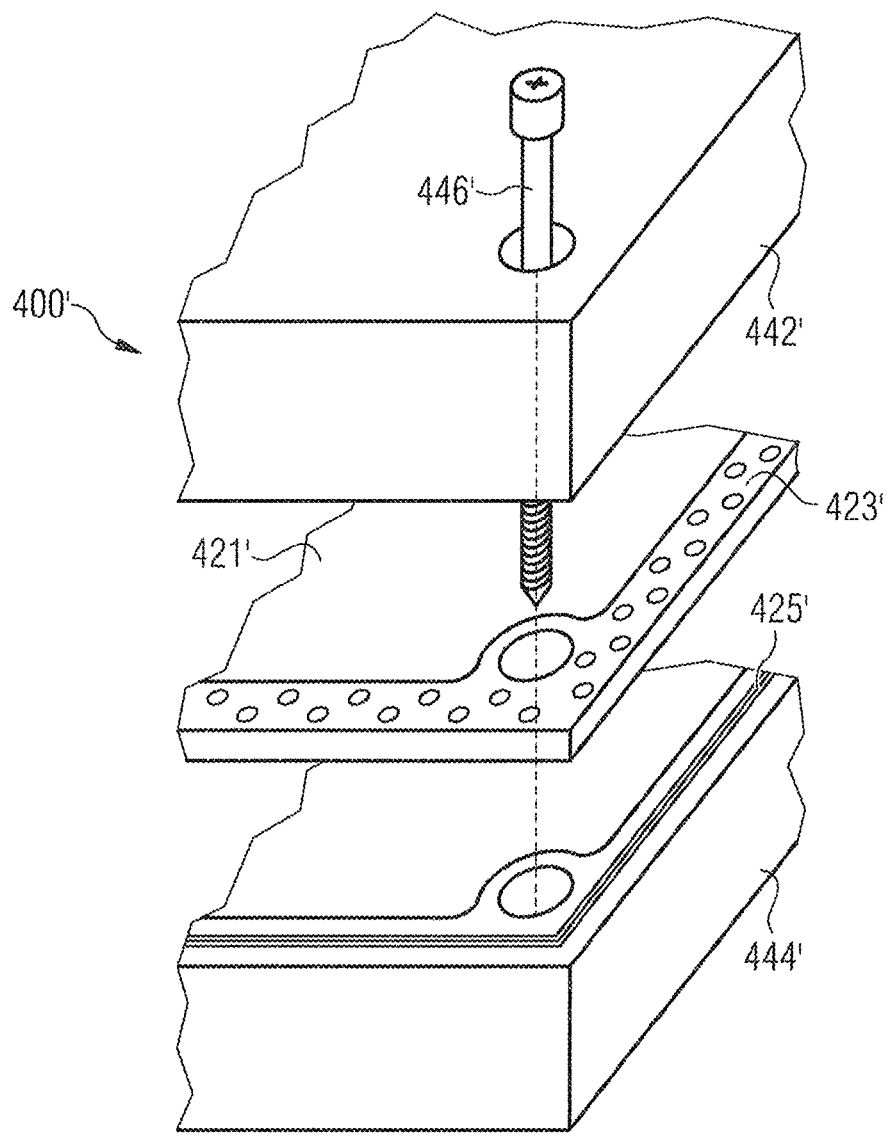

FIG. 7
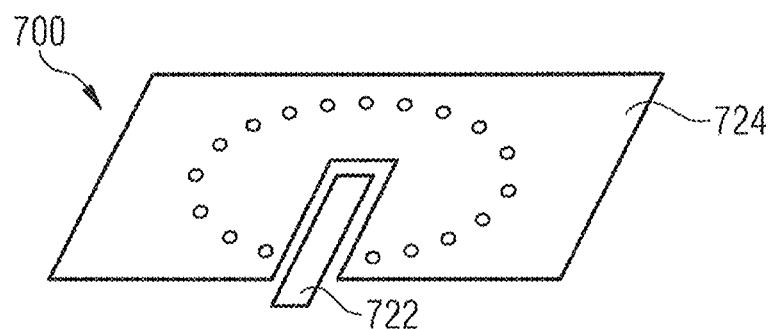
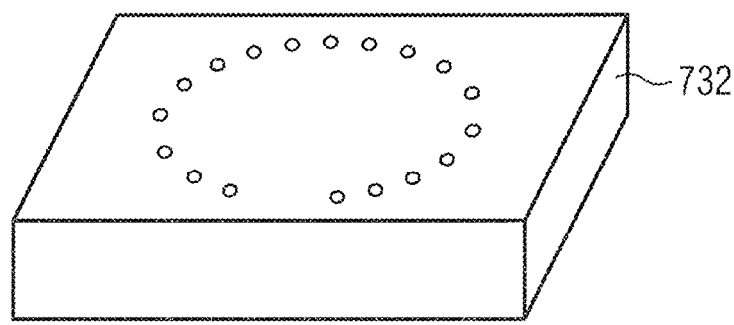
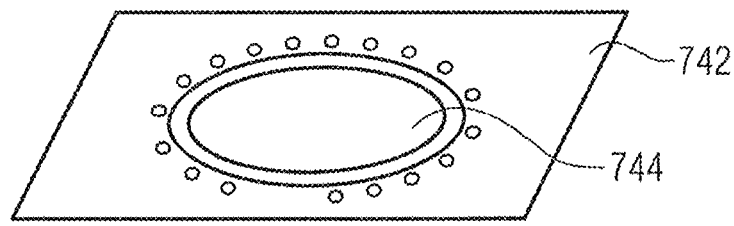
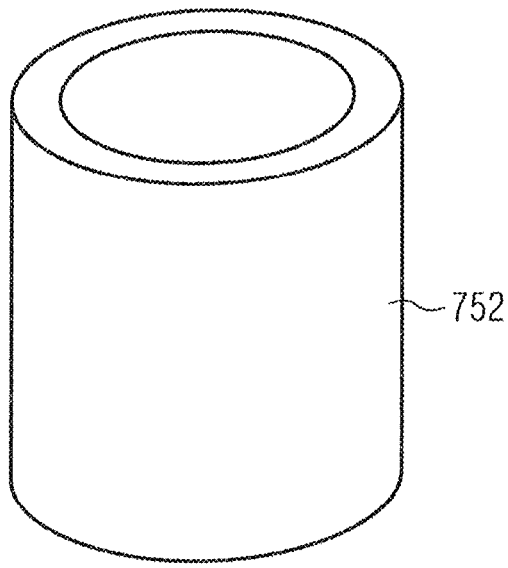

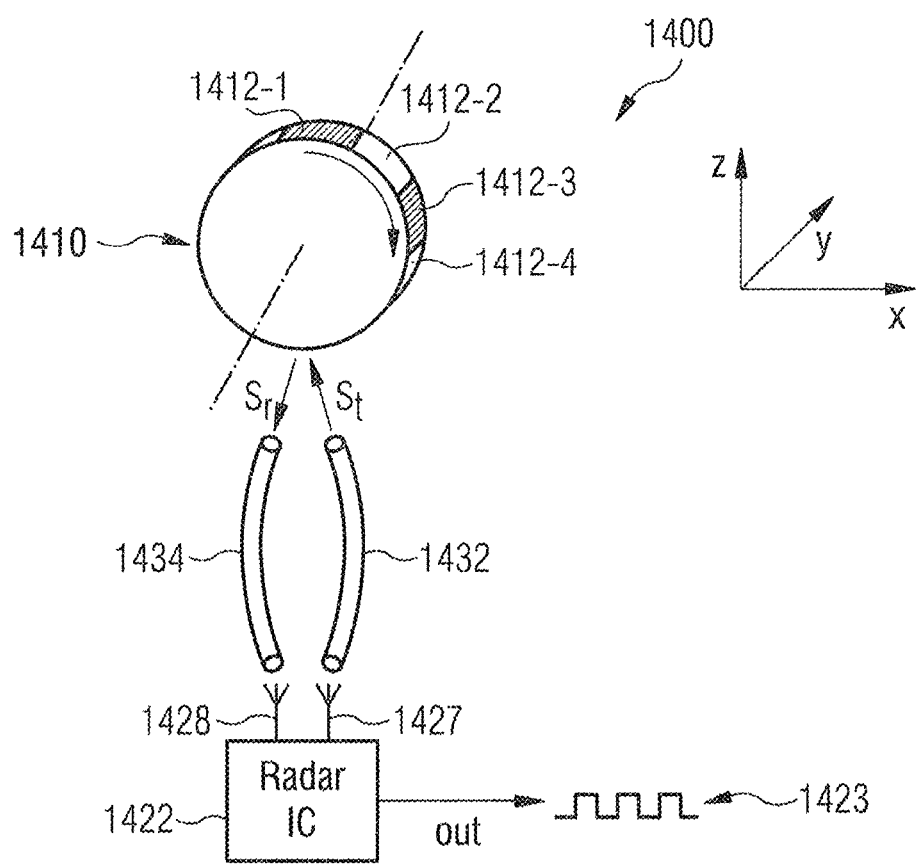

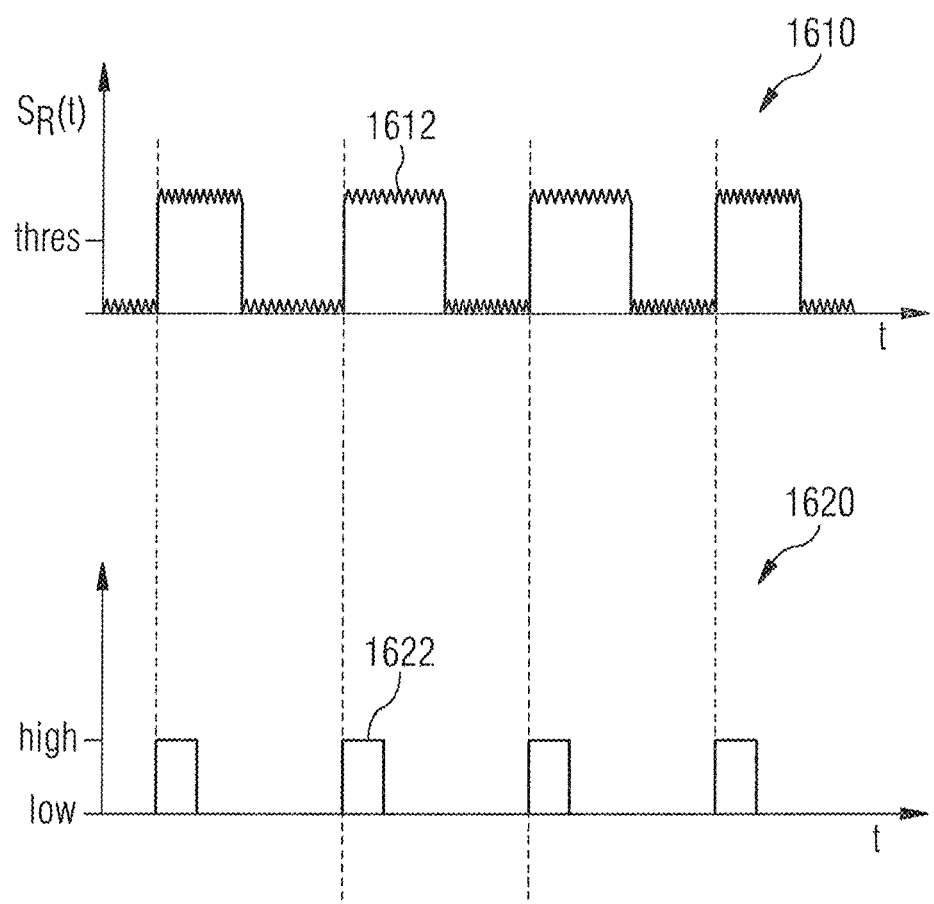

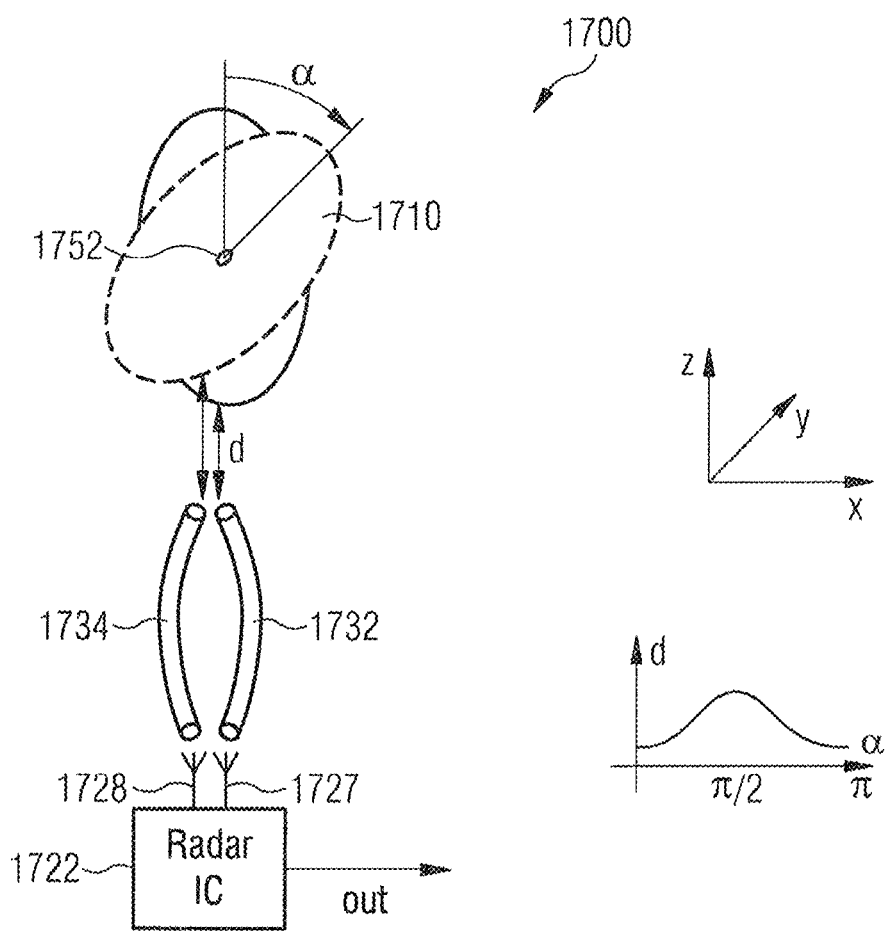

METHODS AND APPARATUSES FOR SPEED AND/OR POSITION SENSING

FIELD

Embodiments relate to methods and apparatuses for speed and/or position sensing and, more particularly, for highly accurate speed and/or position sensing for automotive applications, for example.

BACKGROUND

Numerous vehicular, industrial and consumer applications rely on magnetic sensors. Examples of such applications include speed sensing applications such as wheel speed, transmission speed, crankshaft and camshaft sensing. Wheel speed sensor Integrated Circuits (ICs) may be used to measure the speed of each wheel and detect whether a wheel blocks during breaking (ABS). This measurement may be used as basic input signals for a car's Electronic Stability Program (ESP). Magnetic angle sensors and linear Hall sensors may also be used to measure steering angle and steering torque, for example. It is known to use Hall and magneto-resistive sensing elements for monolithically integrated magnetic sensors.

Magnetic field applications cause additional cost on the application side due to the need of magnetic pole wheels or ferromagnetic tooth wheels and back-bias magnets. Hence, there is a desire to reduce sensor costs in above mentioned vehicular, industrial and consumer applications.

SUMMARY

Various embodiments of the present disclosure propose object-detection sensors that rely on radio signals to determine position and/or speed of movable objects. The proposed sensors can be applied in speed and/or angle sensing applications.

Furthermore, embodiments of the present disclosure propose the use of one or more waveguides to guide a radio signal generated by a transmitter circuit into the proximity, for example, in the range of millimeters (mm) or a few centimeters (cm), of a movable object whose position and/or speed is to be determined. The radio signal can be reflected from the movable object. The reflected radio signal can then be guided back to a receiver circuit by employing one or more waveguides, herein referred to as receive waveguide(s), or the same waveguide, which can then be referred to as transceive waveguide(s), since it transfers both the transmitted radio signal as well as the received reflected radio signal.

According to a first aspect of the present disclosure it is provided a machine. The machine comprises a movable part that is configured to reflect radio signals. The machine further comprises a transmitter circuit configured to generate a radio signal and a transmit waveguide, which is coupled between the transmitter circuit and the movable part. The transmit waveguide is configured to guide the radio signal from the transmitter circuit to the moveable part. The machine moreover comprises a receive waveguide and a receiver circuit. The receive waveguide is coupled between the movable part and the receiver circuit. Additionally, the receive waveguide is configured to guide the radio signal reflected from the movable part to the receive waveguide. The receiver circuit is configured to determine a position and/or a speed of the movable part based on at least the received reflected radio signal.

In some embodiments, the transmit waveguide and/or the receive waveguide can comprise a hollow waveguide, e.g. a hollow rectangular waveguide or a hollow circular waveguide.

In some embodiments, the hollow waveguide can comprise a hollow plastic waveguide, comprising an air-core surrounded by a dielectric layer. The dielectric layer can be made from a polymer material, such as Teflon or polyethylene. Alternatively the core the hollow plastic waveguide can be filled with a noble gas, e.g. helium, neon, argon, krypton, or xenon.

In some embodiments, the transmit waveguide and/or the receive waveguide can comprise a solid plastic waveguide.

In some embodiments, the transmitter circuit and/or the receiver circuit can comprise an integrated circuit.

In some embodiments, the transmitter circuit and the receiver circuit can be integrated in a common semiconductor package or in a common semiconductor chip.

In some embodiments, a plurality of transmitter circuits, a plurality of receiver circuits, and/or a plurality of transceiver circuits can be integrated in a common semiconductor chip or in a common semiconductor package. In other words, even multiple transmitters, receivers or transceivers may be integrated on the same chip or in the same package.

In some embodiments, the machine can further comprise a shielded housing, which is configured to electromagnetically shield the transmitter circuit and/or the receiver circuit, e.g. the transmitter circuit and/or the receiver circuit can be commonly arranged inside the shielded housing.

Moreover, some embodiments can additionally comprise a filter circuit configured to filter a supply voltage from interference signals and to provide the filtered supply voltage to at least one of the transmitter circuit and the receiver circuit. Additionally, the filter circuit, e.g., a power supply, can be arranged in an electromagnetically shielded housing according to an electromagnetic compatibility (EMC) design. This shielded housing (e.g., the same shielded housing that can be employed to shield the transmitter circuit and/or the receiver circuit) can also protect the filter circuit, e.g., the power supply, from electrostatic discharges (ESD). By electromagnetically shielding the filter circuit, e.g., the power supply, and protecting it from ESD, the transmitter circuit, the receiver circuit and/or a transceiver circuit, comprising the transmitter circuit and the receiver circuit, can be realized in a standard CMOS technology. In other words, the supply can be EMC and ESD protected, such that the transceiver can be realized in a standard CMOS technology.

In some embodiments, the filter circuit can comprise at least one of a low pass filter and a voltage regulator. For instance, the low pass filter can comprise serial inductors and/or shunt capacitors. The voltage regulator can comprise a linear regulator and/or a switching regulator.

In some embodiments, the transmit waveguide and the receive waveguide can be routed over a distance of at least five centimeter.

In some embodiments, a first minimum distance between the transmit waveguide and the movable part can be less than 5 cm, and a second minimum distance between the receive waveguide and the movable part can as well be less than 5 cm.

In some embodiments, the transmit waveguide comprises a transmit field transition coupler configured to couple the radio signal from the transmitter circuit into the transmit waveguide.

In some embodiments, the transmit waveguide can comprise a transmit aperture configured to emit the radio signal towards the movable part.

In some embodiments, the receive waveguide can comprise a receive aperture configured to capture the reflected radio signal from the movable part.

In some embodiments, the receive waveguide can comprise a receive field transition coupler configured to couple the reflected radio signal out of the receive waveguide to the receiver circuit.

In some embodiments, the transmit waveguide and the receive waveguide can be integrated in a single transceive waveguide. The transceive waveguide can, for instance, be configured to guide the radio signal, generated by the transmitter circuit, from the transmitter circuit to the movable part, and to guide the radio signal reflected from the movable part to the receiver circuit. Additionally, the transceive waveguide can comprise a directive splitter. The directive splitter can be configured to couple the radio signal from the transmitter circuit into the transceive waveguide and to couple the reflected radio signal out of the transceive waveguide to the receiver circuit.

In some embodiments, the machine can comprise a transceive antenna, which can be configured to couple the radio signal generated by the transmitter circuit into the transceive waveguide and to capture, in other words receive, the reflected radio signal from the transceive waveguide.

In some embodiments, the machine can comprise a duplexer. The duplexer can be configured to transfer the radio signal from the transmitter circuit to the transceive antenna, and can be configured to transfer the reflected radio signal from the transceive antenna to the receiver circuit.

In some embodiments, at least one of the waveguides, e.g. the transmit waveguide, the receive waveguide, and/or the transceive waveguide, can be connected using at least one waveguide connector pair.

In some embodiments, the transmitter circuit can comprise a transmit antenna. The transmit antenna can be configured to couple the radio signal generated by the transmitter circuit into the transmit waveguide.

In some embodiments, the receiver circuit can comprise a receive antenna, which can be configured to capture the reflected radio signal from the receive waveguide.

In some embodiments, the transmitter circuit can be coupled to a plurality of transmit waveguides and the receiver circuit can be coupled to a plurality of receive waveguides.

In some embodiments, the receiver circuit can be configured to determine a position and/or a speed of the movable part based on variation of power of the received reflected radio signal and/or a phase difference between the generated radio signal and the received reflected radio signal.

In some embodiments, adjacent surface portions of the movable part can be configured for alternating electromagnetic reflectivity for the radio signal.

In some embodiments, the movable part can be rotatable around a rotational axis and the receiver circuit can be configured to determine a rotational position and/or a rotational speed of the movable part based on at least the received radio signal. Additionally, in some embodiments, the movable part can comprise a rotationally symmetric cross-section in a plane perpendicular to the rotational axis. Alternatively, in a few embodiments, the movable part can comprise a rotationally asymmetric cross-section in a plane perpendicular to the rotational axis.

In some embodiments, the movable part can be a wheel, a tooth wheel, a disc, or a shaft.

In some embodiments, the transmit waveguide, the receive waveguide and/or the transceive waveguide is fed through a compartment wall of a machine housing using a radio-frequency-feed (RF-feed). For example, the movable part can be inside the machine housing (e.g. a combustion engine housing or a transmission box housing) and the electronic components, e.g., the transmitter circuit, the receiver circuit and/or the filter circuit, can be outside the machine housing or in another compartment of the machine housing. The transmit waveguide, the receive waveguide, and/or the transceive waveguide can be fed via the RF-feed (or a plurality of RF-feeds) through the machine housing, e.g., through a compartment wall of the machine housing. Further, the machine housing can be hermetically sealed. In some embodiments, the RF-feed can include a separate waveguide element that can be connected to a waveguide plug on at least one side of the machine housing.

In some embodiments, the RF-feed can comprise an opening in a compartment wall of the machine housing, wherein a short piece of waveguide, mechanically and electrically compatible with the transmit waveguide, the receive waveguide and/or the transceive waveguide, is fed through the opening in the compartment wall. The short piece of waveguide may, for example, have a length between 1 cm and 3 cm, but also a shorter length, e.g., less than 1 cm, or a longer length, e.g., longer than 3 cm, are possible. The short piece of waveguide may comprise flanges, nuts and/or washers to be mounted against the compartment wall of the machine housing and may comprise flanges and/or waveguide plugs to be connected to the transmit waveguide, the receive waveguide and/or the transceive waveguide. A space between the outer wall of the short piece of waveguide and the compartment wall may be hermetically sealed using sealing rings and/or silicone sealing, for example.

In some embodiments, the RF-feed can comprise a coaxial radio frequency socket connector which is fed through an opening in the compartment wall. The radio frequency socket connector may correspond to an SMA (sub miniature version A), 2.92 mm, a 2.4 mm, a 1.85 mm, and/or a 1.00 mm RF coaxial standard. The transmit waveguide, the receive waveguide and/or the transceive waveguide may be connected to the coaxial radio frequency socket connector using corresponding waveguide-to-coaxial adaptors.

In some embodiments, the machine can comprise a machine housing. The machine housing can be configured to house the moveable part. Furthermore, the machine housing can comprise a fixture configured to receive the transmit waveguide and/or the receive waveguide. Furthermore, the fixture can be configured to direct an end of the at least one received waveguide towards the movable part. In this way, the radio signal can be emitted at the end of the transmit waveguide 1232 in direction of the movable part 1210, and/or the radio signal reflected from the movable part can be received at the end of the receive waveguide 1234.

Optionally, the fixture can be inserted in an opening in the machine housing and can be mounted on the machine housing. At least one received waveguide (e.g., a transmit waveguide and/or a receive waveguide) can be inserted into the fixture from outside the machine housing. Furthermore, an end of the fixture inside the machine housing can be transparent for the radio signal (and the reflected radio signal). This way, the transmit waveguide can conduct the radio signal from the transmitter circuit into the machine housing to the movable part, and/or the receive waveguide can conduct the reflected radio signal from the movable part out of the machine housing back to the receiver circuit.

Optionally, the fixture can comprise at least one dielectric lens attached to the end of the fixture inside the machine housing. The dielectric lens can be directed towards the movable part and can be electromagnetically coupled to the at least one received waveguide. The dielectric lens can focus the radio signal on the movable part and/or can collect more of the reflection of the radio signal from the movable part. In turn, this can improve accuracy for determining the speed and/or the position of the movable part.

In some embodiments, the transmit waveguide, the receive waveguide and/or the transceive waveguide comprises an insulation against environmental influences, for example, against moisture, against fluids and/or against high temperatures (e.g., temperatures above 80° C.). For example, inside a machine housing of the machine there may be moisture due to operational fluids (e.g., motor oil and/or hydraulic fluids) or due to condensed water. Insulating the waveguide (e.g., the transmit waveguide, the receive waveguide and/or the transceive waveguide) against moisture and against fluids, e.g., against direct contact with moisture and with fluids, can prevent additional attenuation of the radio signals guided by the waveguide, e.g., the transmitted radio signal and/or the reflected radio signal. Insulating the waveguide against high temperatures can prevent a deformation of the waveguide due to heat, which can otherwise cause attenuation of the radio signals guided by the waveguide. In some embodiments, the insulation against environmental influences can, for example, comprise a foam coating, a rubber coating, and/or a metal shield, wherein the foam coating, the rubber coating, and/or the metal shield can be arranged around the waveguide (e.g., the transmit waveguide, the receive waveguide and/or the transceive waveguide). In other words, in some embodiments, the transmit waveguide, the receive waveguide, and/or the transceive waveguide is isolated versus operational fluids (e.g., motor oil), which can be used inside the machine housing, in order to avoid direct contact between the waveguide and these fluids which can lead to a loss of energy. This isolation can, for example, be achieved by a foam coating or a metal shield around the waveguide, e.g., around a plastic waveguide, such as a fiber.

In some embodiments, the transmit waveguide, the receive waveguide and/or the transceive waveguide comprises a first waveguide section and a second waveguide section. The first waveguide section can comprise a dielectric waveguide, e.g., a solid plastic waveguide, a hollow plastic waveguide, or a metallic waveguide filled with a dielectric medium, for example a polymeric material. The second waveguide section can comprise a hollow waveguide, e.g., a hollow metallic waveguide. According to some embodiments, the second waveguide section may form a passage through a fluid, e.g., an operational fluid, or a passage through a machine housing which is subjected to moisture and/or to high temperatures (e.g., temperatures above 80° C.). In other words, the passage through the operational fluid can be realized by a metallic hollow waveguide segment.

According to some embodiments, at least one of the transmit waveguide and the receive waveguide can comprise a first solid plastic waveguide section and a second solid plastic waveguide section. The first and the second solid plastic waveguide section can each be coated by a respective dielectric foam tube or a metal coat. The respective dielectric foam tubes can have a dielectric constant lower than a dielectric constant of the first and the second solid plastic waveguide section. The dielectric foam tubes can provide sufficient space between the coated solid plastic waveguide sections and other parts of the machine. Hence, an electromagnetic field of a radio signal propagating through the solid plastic waveguide sections might not be disturbed by other parts of the machine so that losses in the solid plastic waveguide sections can be reduced.

An end of the first solid plastic waveguide section can be connected to an end of the second solid plastic waveguide section by a fixture tube. The fixture tube can be configured to align a face side of the end of the first solid plastic waveguide section with a face side of the end of the second solid plastic waveguide section. This way, radio signals can transit from one solid plastic waveguide section to the other. By connecting at least two solid plastic waveguide sections with each other, the transmit waveguide and/or the receive waveguide can be trimmed to a desired length suitable for the installation conditions in the machine.

In some embodiments, the machine can be a vehicle, e.g. a car, a truck or a motorbike, or part of a vehicle, e.g. a transmission, a motor, a generator, or a chassis.

According to another aspect of the present disclosure, it is provided a sensor apparatus. The sensor apparatus comprises an electromagnetically shielded, integrated transceiver circuit, which comprises a transmitter portion configured to generate a radio signal and a receiver portion. The sensor apparatus also comprises a transmit waveguide and a receive waveguide. The transmit waveguide is coupled to the transmitter portion and is configured to guide the radio signal from the transmitter portion to a movable part. The receive waveguide is coupled to the receiver portion and is configured to guide a radio signal reflected from the movable part to the receiver portion. The receiver portion is configured to sense a position and/or a speed of the movable part based on at least the received reflected radio signal.

In some embodiments, the sensor apparatus can comprise a filter circuit configured to filter a supply voltage from interference signals and to provide the filtered supply voltage to the integrated transceiver circuit.

According to yet another aspect of the present disclosure, it is provided a method for determining a position and/or a speed of a movable part. The method comprises generating a radio signal with a transmitter circuit and coupling the radio signal from the transmitter circuit into a transmit waveguide. The radio signal is guided from the transmitter circuit to the movable part through the transmit waveguide and emitted from the transmit waveguide towards the movable part. Furthermore, the method comprises reflecting the radio signal from the movable part, capturing the reflected radio signal from the movable part with a receive waveguide, and guiding the reflected radio signal from the movable part to a receiver circuit through the receive waveguide. The reflected radio signal is coupled out of the receive waveguide to the receiver circuit. Moreover, the method includes determining a position and/or a speed of the movable part with the receiver circuit based on at least the received reflected radio signal.

BRIEF DESCRIPTION OF THE FIGURES

Some embodiments of apparatuses and/or methods will be described in the following by way of example only, and with reference to the accompanying figures, in which FIGS. 1a, b illustrate examples of incremental magnetic field sensing;

FIG. 7 illustrates an example of a proximity coupling structure from a circuit board to a hollow circular waveguide;

FIG. 14 shows an example for a radio wave based incremental speed sensor;

FIG. 16 illustrates an example of a reflected radio signal related to exemplary embodiments for speed sensing;

FIG. 17 shows an example of a radio wave based sensing system using a rotationally asymmetric movable part;

DETAILED DESCRIPTION

Figure 1A:
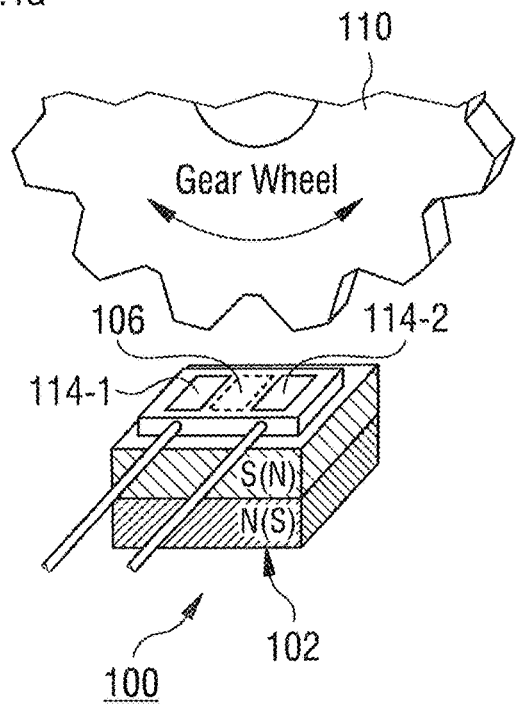

Various example embodiments will now be described more fully with reference to the accompanying drawings in which some example embodiments are illustrated. In the figures, the thicknesses of lines, layers and/or regions may be exaggerated for clarity.

Accordingly, while further embodiments are capable of various modifications and alternative forms, some example embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of further example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art, unless expressly defined otherwise herein.

Some embodiments of the present disclosure propose to measure rotational speed or position based on structured targets using a radar system instead of magnetic field sensors. For example, automotive radar is currently used for distance measurements in a scale range from a few tens of centimeters to a few hundred meters. Embodiments propose a complete new concept for speed or angle sensors currently in vehicles or other machines utilizing measurements in the sub-centimeter or even sub-millimeter range by low power radar sensors of low complexity. As such, this new concept is capable to replace conventional magnetic sensors used for speed or angle sensors thereby decreasing system costs.

Magnetic incremental field measurement is well established. Two example principles of magnetic sensing are shown in FIGS. 1a and b.

In the example of FIG. 1a, a magnetic sensor 100 is used to detect a position and/or speed of a rotatably movable ferromagnetic tooth or gear wheel 110. The magnetic sensor 100 comprises a back bias magnet 102 to generate a bias magnetic field which is influenced by the moving gear wheel 110. Further, the magnetic sensor 100 comprises first and second magnetic sensor elements 114-1, 114-2 to sense variations of the bias magnetic field due to the gear wheel 110. Examples of magnetic sensor elements are Hall sensor or magneto-resistive sensor elements. Optional signal processing circuitry 106 may further process the signals provided by the magnetic sensor elements 114-1, 114-2. Due to the differential setup of the magnetic sensor elements 1141, 114-2 also a rotational direction of the gear wheel 110 can be detected, for example, based on phase differences between signals of the first and second magnetic sensor elements 114-1, 114-2. Output signals of the magnetic sensor 100 may be fed to an Electronic Control Unit (ECU) of a vehicle, for example.

Figure 1B:
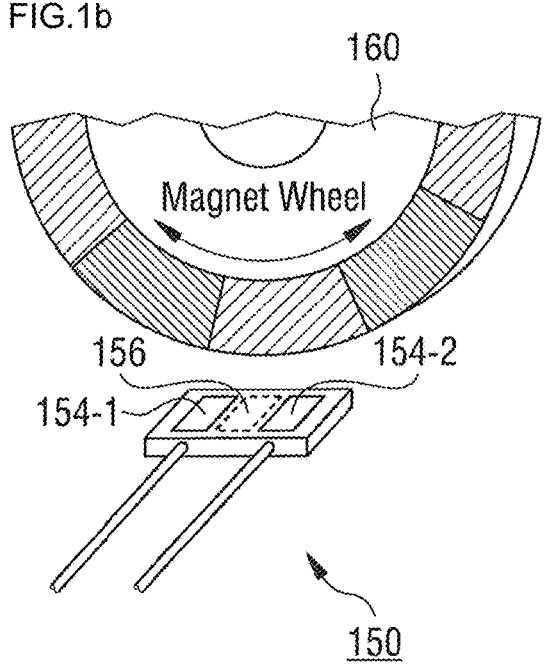

A different setup for magnetic incremental speed/position sensing is shown in FIG. 1b. In this example, a magnetic sensor 150 is used to detect a position and/or speed of a rotatably movable magnetic encoder wheel (magnetic pole wheel) 160 comprising alternating magnetic poles in circumferential direction. The magnetic sensor 150 comprises first and second magnetic sensor elements 154-1, 154-2 to sense variations of the magnetic field originating from the rotating encoder wheel 160. Again, examples of magnetic sensor elements are Hall sensor or magneto-resistive sensor elements. An optional signal processing circuitry 156 may further process the signals provided by the magnetic sensor elements 154-1, 154-2. Due to the differential setup of the magnetic sensor elements 154-1, 154-2 also a rotational direction of the encoder wheel 160 can be detected. Output signals of the magnetic sensor 150 may be fed to an Electronic Control Unit (ECU) of a vehicle, for example.

The magnetic sensing setups of FIG. 1 can be used in automotive applications including angle sensing applications or speed sensing applications such as wheel speed, transmission speed, crankshaft and camshaft sensing. However, such magnetic field applications can cause additional cost and/or space requirements on the application side due to the need of magnetic pole wheels or ferromagnetic tooth wheels and back bias magnets.

Embodiments of the present disclosure therefore propose a completely new concept utilizing radar sensors for angle and/or speed sensing applications. As will be appreciated by the skilled person having benefit from the present disclosure, a tooth wheel could be made simpler in case of a radar, e.g., a plastic tooth wheel, a disc with a printed metal pattern that changes the reflectivity, or a disc with holes, wherein solid parts between the holes are configured to reflect radio signals (e.g., electromagnetic waves). In applications related to gear boxes or transmissions, conventional tooth wheels can be used together with radar sensors for rotational speed sensing. Compared to magnetic sensors, these tooth wheels do not have to be ferromagnetic or have back-bias magnets installed.

Automotive radar is currently used for distance measurements in a larger scale range d=1 . . . 200 m. The price per radar system is rapidly decreasing and a reduction of a radar system to the requirements of a very short distance measurement (e.g., d=1 . . . 5 mm) needed for the targeted applications would allow a further cost down due to reduced power consumption ($\sim d^{-4}$). On top of this, the change of the application from a linear distance measurement to a binary pattern detection would allow a further simplified design of the radar system. This indicates that the cost scaling function of radar systems for incremental speed and position sensors should be much more aggressive than the one of magnetic ones. Consequently, a cost situation that can initiate a replacement of magnetic field sensors by radar systems could be reached.

When equipping a machine with a radar sensor to determine a position and/or a speed of a movable part of the machine, it may often be found that the installation conditions and the installation space are limited. In the first place, no matter if a radar sensor or a magnetic sensor are employed, an electric power supply, e.g. one or several supply voltages, must be provided to the sensor for its operation. These supply voltages might not be available at the measurement location. They may be wired to the measurement location, however, wires carrying supply voltages may be susceptible to electromagnetic interference signals. Such interference signals may often be generated by transient events. For example, inside vehicles ignition coils usually create short electric pulses with high voltages ranging beyond several kilovolts (kV). These short electric pulses often have a spread frequency spectrum, such that they may interfere at various frequencies occupied by wanted signals, e.g. sensor signals, by coupling into wires or other kinds of conductors carrying supply voltages. For example, a receiver circuit of a radar sensor may comprise a low noise amplifier (LNA) to detect reflected radio signals of very low power, e.g. powers between 0.01 µW and 10 µW. A strong interference pulse that couples into the supply voltage of the LNA may either modulate the weak received reflected radio signal or couple to a signal output of the LNA superimposing the received reflected radio signal, such that it may not be detected any longer by the receiver circuit. Further, a strong interference pulse, which couples into the supply voltage, may damage some kinds of radar sensors, if a protection structure (e.g., a filter circuit) is not employed to shield these radar sensors from such interference pulses. However, such protection structures (e.g., filter circuits) can be costly due to their high area (e.g., circuit board area) consumption. Moreover, inference signals may be misinterpreted as reflected radio signals by the receiver circuit, which may result in erroneous measurements of a position and/or a speed of the movable part. Furthermore, it should be amended that interference signals might not only interfere with the radio signal of the radar sensor if they are of the same frequency, e.g. the same carrier frequency, or cover partially the same frequency domain, e.g. the same carrier frequency domain. Interference, for example in the receiver circuit or in a transmitter circuit of the radar sensor, may also occur on intermediate or baseband frequencies used by the receiver circuit and/or the transmitter circuit. For instance, interference may be due to spurious responses of the radar sensor, e.g. a fundamental or harmonic frequency component of the interference signal may mix with a fundamental or harmonic frequency component of a local oscillator of the radar sensor to an intermediate or baseband frequency. Consequently, the interference signal may occur in a radio signal output of the transmitter circuit, e.g. superimpose the generated radio signal, and/or may occur in an intermediate or baseband signal path of the receiver circuit.

Filtering the supply voltages of the radar sensor or the magnetic sensors may generally be possible, nevertheless, such filter circuits may often be bulky when compared to a radar sensor integrated into a semiconductor chip, for example. Filter circuits may, for instance, comprise several ceramic capacitors, which may often require more space on a printed circuit board than integrated radar sensors.

Figure 2:
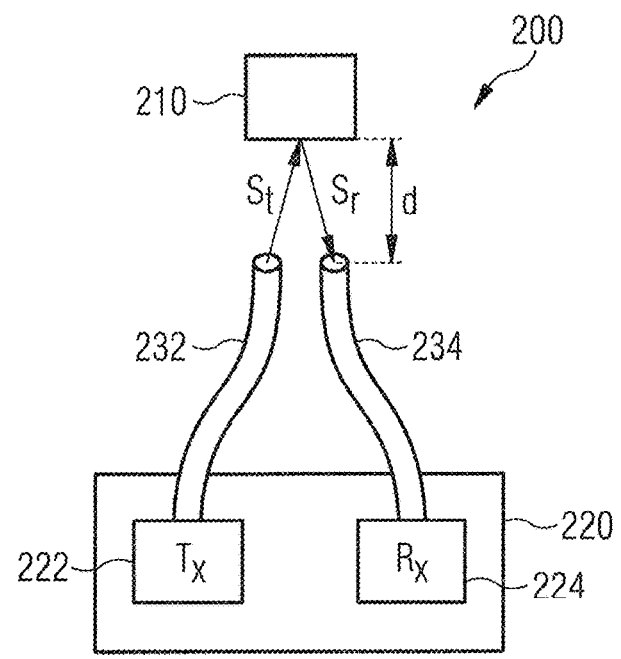
FIG. 2 shows a diagram of a sensing system according to an embodiment.

To circumvent restrictions of limited installation space and of arranging radar sensor circuits in an immediate vicinity of the movable part, e.g. within in a distance of 5 cm or less, it is an aspect of the present disclosure to guide the radio signal generated by a transmitter circuit to the movable part using a transmit waveguide, and to guide the radio signal reflected from the movable part to a receiver circuit using a receive waveguide. Hence, according to some embodiments, these waveguides may be more than 5 cm long, or sometimes also longer than 30 cm. In some possible implementations they may be even more than one meter (m) long and, if the sensor apparatus is used within a machine, the waveguides may be routed around other parts of the machine to the movable part, whose position and/or speed are to be determined. This is illustrated in FIG. 2, which displays a high-level block diagram of a system or a machine 200 according to an embodiment.

The machine 200 comprises a movable part 210, a radar sensor 220, an electromagnetic transmit waveguide 232, and an electromagnetic receive waveguide 234. The radar sensor 220 comprises a transmitter circuit 222 and receiver circuit 224. Depending on the frequency, the electromagnetic waveguides 232, 234 can be constructed from conductive and/or dielectric materials. The waveguides can be used for transferring both power and RF signals.

In some embodiments, the movable part 210 can, for example, be a tooth wheel in a transmission or a cam of a camshaft or an artificial target, for example, a disc with holes. The artificial target can, for example, be used to sense a position or a speed of another movable part, to which it is attached to. In other words, the artificial target may not have any mechanical function in the application.

The transmitter circuit 222 is configured to generate a modulated or unmodulated radio signal and to couple the radio signal into a first end of the transmit waveguide 232. The transmit waveguide 232 may then guide the radio signal to a second end of it, the second end of the transmit waveguide 232 being within a distance d of the movable part. The distance d may be less than 5 cm. In some embodiments, the distance d may be even smaller, for example, smaller than 3 cm, smaller than 1 cm, or even smaller than 5 mm. For example, the distance d may amount to a value between 1 mm and 5 mm. The distance d may be understood as the shortest distance between a surface portion of the movable part 210 facing the second end of the transmit waveguide 232. The transmit waveguide may additionally be configured to emit the radio signal $S_t$ from the second end towards the movable part, where it may be reflected.

The receive waveguide 234 may be configured to capture a reflection $S_r$ of the radio signal from the movable part at a first end of it, which is in close proximity to the movable part. For instance, the first end of the receive waveguide 234 may also be within the distance d of the movable part 210, or at a distance slightly different to the distance d, e.g. a few millimeter or centimeter nearer or farther away. The receive waveguide 234 may then guide the reflected radio signal to a second end of it. At the second end of the receive waveguide 234, the reflected radio signal can be received by the receiver circuit 224, which is configured to determine a position and/or speed of the movable part based on at least the received reflected radio signal. In some embodiments, the position and/or speed may be determined based on a combination of the generated radio signal and the received reflected radio signal.

Corresponding to the lengths of the transmit waveguide 232 and of the receive waveguide 234, the radar sensor may be placed farther away from the movable part 210, for example in a distance between 5 cm and 100 cm, but also even farther distances may be possible, for example a distance between 1 m and 3 m. This may provide additional degrees of freedom when equipping the machine 200 with the radar sensor 220.

Even though the radar sensor 220 may be placed farther away from the movable part 210, the transmitter circuit 222 may generate the radio signal with only a small electric power, e.g. in the micro-Watt (μW) range, as the transmit waveguide 232 may bridge the distance between the transmitter circuit 222 and the movable part 210, and receive waveguide 234 may bridge the distance between the movable part 210 and the receiver circuit 224 at low losses. For example, the transmit waveguide 232 or the receive waveguide 234 may have an insertion loss of 1 dB/m to 3 dB/m and about 2 dB loss per connection.

In some embodiments, the machine 200 may be a vehicle, such as a car, a truck or a motorbike, or a part of a vehicle, e.g. a transmission, a motor, a generator, or a chassis. However, the skilled person having benefit from the present disclosure will appreciate that the machine 200 could be any machine using sensor equipment for motion detection of one or more movable parts of the machine. That is to say, the machine 200 could also be an industrial machine, a household machine or the like.

According to embodiments, the radar sensor 220 makes use of the radar principle. Radar is an object-detection system that uses radio waves to determine properties of objects, e.g. their position and/or their speed. The transmitter circuit 222 transmits radio waves or microwaves via the transmit waveguide 232 that are reflected from the movable part 210. The receiver circuit 224, which may be integrated within the same semiconductor package or monolithically integrated with transmitter circuit 222, receives these reflected waves via the receive waveguide 234 and processes them to determine properties of the movable part 210. In case the receiver circuit 224 is integrated with the transmitter circuit, they may be regarded as a transceiver circuit. The radar sensor 220 may comprise further analog and/or digital hardware components such as power supply circuitry, electronic oscillator circuitry, modulator circuitry, amplifier circuitry and/or impedance matching circuitry.

Figure 3A:
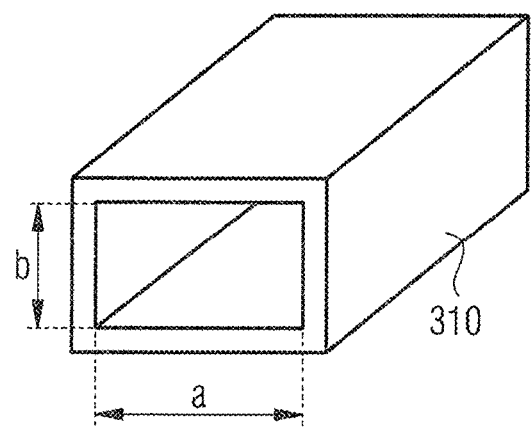
FIGS. 3a-c show examples of waveguides that may be used for guiding generated and reflected radio signals.
Figure 3B:
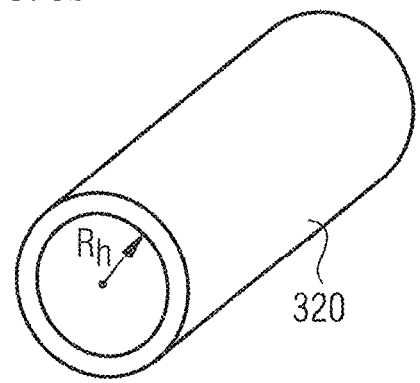

FIGS. 3a, b, and c illustrate some possible implementations of the transmit waveguide and/or the receive waveguide. For example, the transmit waveguide and/or the receive waveguide may comprise a hollow waveguide, e.g. a hollow rectangular waveguide 310 as shown in FIG. 3a or a hollow circular waveguide 320 as displayed in FIG. 3b. The hollow rectangular waveguide 310 and the hollow circular waveguide 320 may be made out of metal, such as copper or aluminum, or metal alloys, and may additionally be coated with gold or silver and be polished on the inside. In an embodiment, the transmit waveguide and the receive waveguides comprise a hollow waveguide, which may have either a rectangular or circular cross section and is coated with gold. The gold coating may provide a higher conductivity than aluminum, so that surface currents on the waveguide can flow at a lower resistance, which in turn may reduce the insertion loss of the transmit waveguide and the receive waveguide.

Figure 3C:
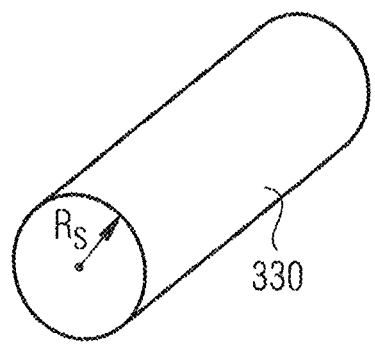

Alternatively, the transmit waveguide and/or the receive waveguide may be hollow plastic waveguides or solid plastic waveguides, a solid plastic waveguides 330 being depicted in FIG. 3c. Plastic waveguides, hollow or solid, may for example be made from polymeric materials, e.g. Teflon or polyethylene, which may come at low cost compared to metal waveguides. In some possible implementations, plastic waveguides may further be coated with a metal layer and/or a rubber hose.

A radio signal, e.g. the radio signal generated by the transmitter circuit and the reflection of the radio signal from the moveable part, may be associated with electromagnetic waves. In other words, radio signals may physically be realized by electromagnetic waves. In free space an electromagnetic wave may spread, e.g. propagate, spherically from the point where it is emitted from. This may result in attenuation, e.g. free-space path losses, of the electromagnetic wave as its energy is distributed over an increasing larger imaginary sphere as the wave propagates. A waveguide, however, such as the transmit waveguide or the receive waveguide, may be used as a guiding channel for electromagnetic waves. That is to say, the energy of the electromagnetic wave may be confined to a core of the waveguide and travel along the waveguide by being reflected at inner walls in case of a hollow waveguide or at the air to plastic interface (or metal to plastic interface) in case of a solid plastic waveguide. According to at least some embodiments of the present disclosure, before the generated radio signal is released into free space and emitted towards the movable part, it is guided by the transmit waveguide into a vicinity of the movable part, e.g. within a distance of less than 5 cm, such that the energy of the electromagnetic wave carrying the radio signal may be focused onto the movable part and additional free-space path losses may be avoided. Correspondingly, a first end of the receive waveguide may be arranged closely, e.g. within a distance of less than 5 cm, to the movable part to capture a reflection of the radio signal from the movable part, before it has undergone a high free-space path loss. The receive waveguide may then guide the reflection to the receiver circuit at a second end of the receive waveguide.

The cross section dimensions, e.g. the width a and the height b of the hollow rectangular waveguide 310, the radius $R_h$ of the hollow circular waveguide 320, and the radius $R_s$ of the solid circular plastic waveguide 330, may be chosen according to a carrier frequency of the radio signal generated by the transmitter circuit, which may allow a single mode operation of the waveguides. By single mode operation it is understood that only a fundamental mode can propagate along the waveguide, whereas higher order modes undergo an exponential decay. This in turn may provide higher signal integrity, e.g. an electromagnetic pulse that propagates along the waveguide may keep its shape and may avoid being spread in time.

In some embodiments, the transmit waveguide and the receive waveguide may also serve as high pass filters configured to filter interference signals. The frequency of interference signals, for example interference signals caused by transient events inside the machine, like electric pulses created by an ignition coil, may be below a cutoff frequency of the transmit waveguide and/or of the receive waveguide, such that interference signals that couple into the waveguides will undergo a high attenuation, for example 60 dB to 100 dB or even higher. In other words, such interference signals may decay exponentially along the waveguides. Hence, their power may be small compared to the power of the radio signal generated by the transmitter circuit or compared to the power of the reflected radio signal received at the receiver circuit. Further the transmit waveguide, the receive waveguide and/or the transceive waveguide can be designed to preferably propagate electromagnetic waves of a certain polarization. The frequency selectivity (e.g., the high pass characteristic), the polarization selectivity, the high carrier frequency of the radio signal with respect to other signals used, for example, in car electronics, and/or the good shielding properties of many solid materials for radar waves (e.g., electromagnetic waves with frequencies above 10 GHz, above 20 GHz, or above 60 GHz) can make a distortion of the radio signal guided through the waveguide very unlikely, e.g., can shield the sensor apparatus from interference signals.

Moreover, the transmit waveguide or the receive waveguide may be impenetrable to interference signals, e.g. coupling of interference signals into the waveguides may only occur at high coupling losses, for example in the range of 40 dB to 80 dB, as the interference signals may have to impinge the waveguides within a limited range of incident angles in order to be refracted into the core of a waveguide and to propagate inside the waveguide. In case of a metal waveguide, the metal conductive walls of the waveguide may shield the core of the waveguide from coupling of interference signals.

Figure 4A:
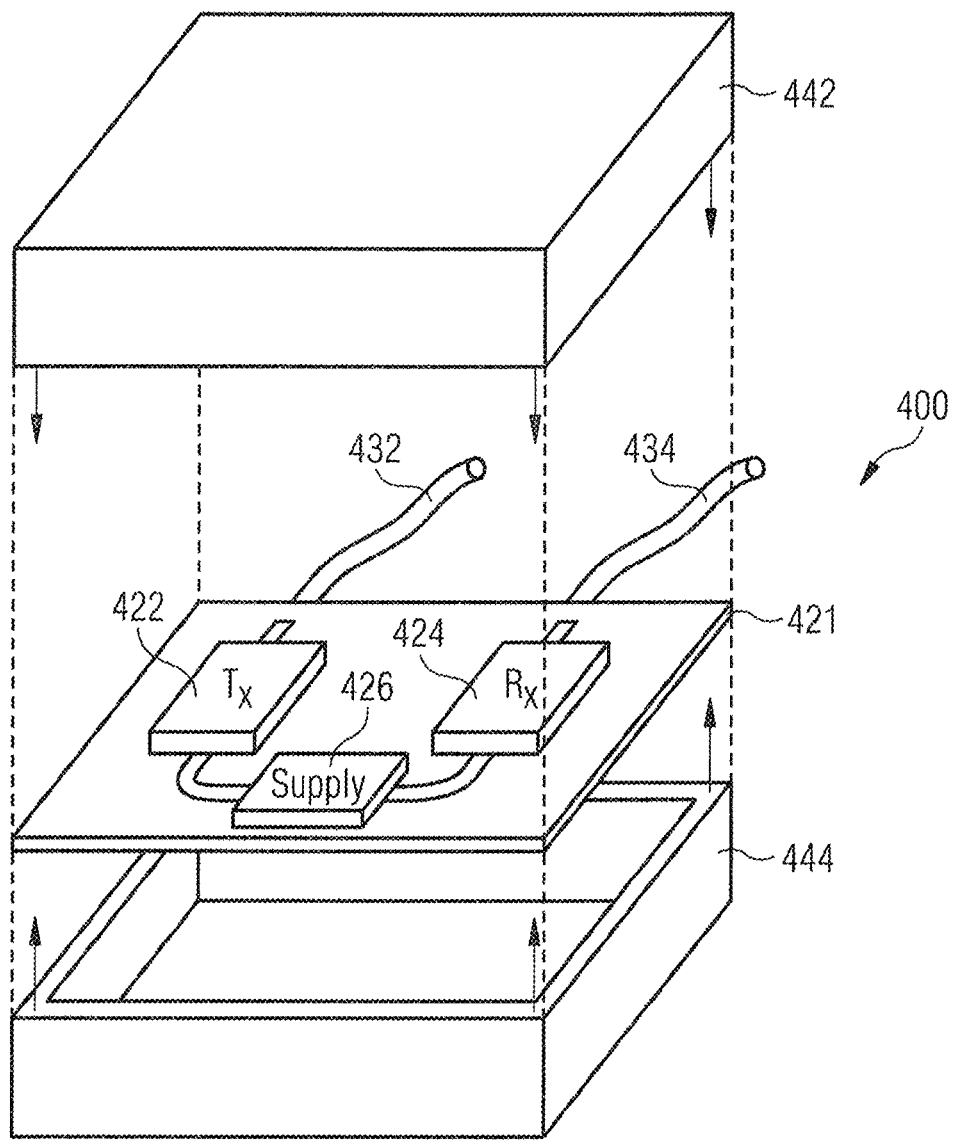
FIGS. 4a,b show an example of a sensor apparatus comprising a shielded housing.

FIG. 4a shows an embodiment of a sensor apparatus 400 of the present disclosure, in which a transmitter circuit 422 and a receiver circuit 424 may additionally be electromagnetically shielded by employing a shielded housing. The shielded housing may comprise metal covers, e.g. a top cover 442 and a bottom cover 444 out of solid metal or forming a metal cage. For example, conductive metals, such as copper, aluminum, iron, steel, silver, gold or metal alloys, such as mu-metal, may be used as materials for the top cover 442 and the bottom cover 444. In an embodiment, the top cover 442 and the bottom cover 444 are made from aluminum and are coated with silver, wherein the silver coating may provide a higher conductivity and thus enhanced shield attenuation. Optionally, the top cover 442 and the bottom cover 444 may be covered by a mu-metal-layer, e.g. they may be taped with a mu-metal foil. The mu-metal foil may provide enhanced shield attenuation against low frequency magnetic fields. The top cover 442 and the bottom cover 444 may surround a circuit board 421, on which the transmitter circuit 422 and the receiver circuit 424 are mounted.

FIG. 4b shows how the top cover 442' may be connected to the bottom cover 444' by screws in a possible embodiment of a sensor apparatus 400'. In other embodiments, a top cover and a bottom cover may also be connected by clips, rivets, nails, or by gluing, welding, or soldering. In FIG. 4b an exemplary screw 446' is passed from the top cover 442' through a hole inside the circuit board 421' into a screw thread, which is arranged in a corner of the bottom cover 444'. The circuit board 421' may be a double layer or a multilayer printed circuit board. For connecting the top cover 442' and the bottom cover 444' to ground, the circuit board 421' may comprise a grounded top planar conductor structure 423' on a top layer and a corresponding grounded bottom planar conductor structure on a bottom layer. These planar conductor structures may be electrically connected with the top cover 442' and the bottom cover 444' as the top cover 442' is screwed against the bottom cover 444' while having the circuit board 421' in between. The top planar conductor structure 423' and the bottom planar conductor structure may be electrically connected by conductive via through-holes, as also shown in FIG. 4b. The top planar conductor structure 423', the bottom planar conductor structure, and the via through-holes may form a fence like structure along the outer edge of the circuit board 421' and provide additional shielding to the transmitter circuit and the receiver circuit as well as to any other circuits mounted on the circuit board 421'. Additionally, the top cover 442' and the bottom cover 444' may have notches arranged in their side walls, like the notch 425' inside the bottom cover 444'. Sealing cords, for example made from silicon or rubber, may be placed inside the notches to provide a planar fitting of the top cover 442' and the bottom cover 444' onto the circuit board 421'. This may additionally enhance the shield attenuation of the shielded housing.

According to at least some embodiments, FIG. 4a moreover shows a filter circuit 426, placed on the circuit board 421 and thus also surrounded by the shielded housing. The filter circuit 426 may filter a supply voltage from interference signals or other spurious alternating voltages and provide the filtered supply voltage to the transmitter circuit 422 and the receiver circuit 424.

Figure 5A:
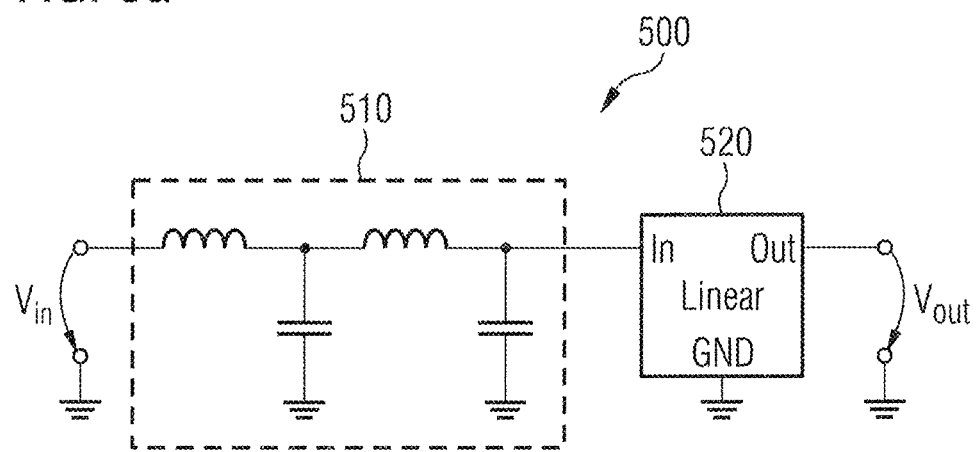
FIGS. 5a, b illustrate an example of a filter circuit together with its input and output voltages configured to filter a supply voltage in a sensing system.
Figure 5B:
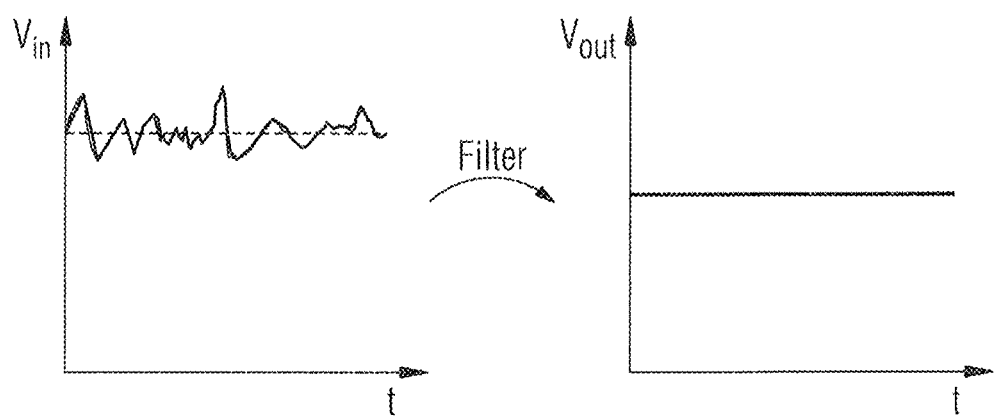

According to the present disclosure, FIG. 5a shows an example of the filter circuit 500, which may be used as a possible implementation of the filter circuit 426. An input voltage $V_{in}$ may be applied to an input of the filter circuit 500. This input voltage is configured to supply electric DC power to the transmitter circuit and to the receiver circuit. It may however be superimposed by interference signals and/or other spurious alternating voltages, as shown in FIG. 5b, where $V_{in}$ is displayed over time and fluctuates about a DC value. To filter $V_{in}$ from these interference signals and/or other spurious alternating voltages, $V_{in}$ is first passed through a low pass filter circuit 510 and then passed through a linear voltage regulator 520. The low pass filter circuit 510 is configured to attenuate the interference signals and/or other spurious alternating voltages. It may comprise serial-inductors, such as ferrite-core inductors, ceramic-core inductors, and/or air-core inductors, and shunt-capacitors, e.g. ceramic capacitors and/or electrolytic capacitors. The low pass filter circuit 510 may further comprise serial resistors and/or shunt resistors (not shown in FIG. 5a). The linear voltage regulator 520 may be configured to attenuate the interference signals and/or other spurious alternating voltages. Moreover, it may be configured to provide an output voltage $V_{out}$ set to a voltage value that is suitable for an operation of the transmitter circuit and/or the receiver circuit, e.g. $V_{out}$ may match a supply voltage needed by the transmitter circuit and/or the receiver circuit. The transmitter circuit and/or the receiver circuit may be connected to the output voltage $V_{out}$, which is clean of interference signals and/or other spurious alternating voltages, as shown in FIG. 5b, wherein $V_{out}$ is displayed over time. In addition, the filter circuit 500 may be configured to protect the transmitter circuit and/or the receiver circuit from voltages, e.g. voltage pulses, which may exceed an absolute maximum voltage rating of the transmitter circuit and/or the receiver circuit and would possibly damage the transmitter circuit and/or the receiver circuit permanently.

In some embodiments, the ordering of the low pass filter circuit 510 and the linear voltage regulator 520 may be reversed. Optionally, also switched voltage regulators may be employed in addition or alternatively. Furthermore, the filter circuit 500 may comprise several low pass filter circuits and/or several voltage regulators for enhanced filtering, according to some possible implementations.

FIG. 4a also shows a transmit waveguide 432 and a receive waveguide 434. The transmit waveguide 432 may guide the radio signal generated by the transmitter circuit 422 from the inside of the shielded housing to the movable part outside the shielded housing. Correspondingly, the receive waveguide 434 may guide the radio signal reflected from the movable part from the outside of the shielded housing to the receiver circuit 424 inside the shielded housing. That is to say, the transmit waveguide 432 and the receive waveguide 434 provide means to transfer signals, e.g. radar signals, between the transmitter circuit 422/the receiver circuit 424 and the movable part, while the transmitter circuit 422 and the receiver circuit 424 are shielded from electromagnetic interference signals. In some embodiments, the transmit waveguide 432 and the receive waveguide 434 may be conducted through an opening, e.g. a connector or a feed, in the shielded housing, whose size may correspond to the cross sectional size of the transmit waveguide 432 and the receive waveguide 434.

In some embodiments, the transmitter circuit may comprise a transmit antenna, whereas the receiver circuit may comprise a receive antenna. The transmit antenna may be configured to couple the radio signal generated by the transmitter circuit into the transmit waveguide. The receive antenna may be configured to capture, e.g. receive, the reflected radio signal from the receive waveguide and provide it to the receiver circuit. For example, the transmit antenna and/or the receive antenna may be a directional antenna, such as a microstrip antenna, in particular a patch antenna, a printed frame antenna or a printed dipole antenna. For the transmit antenna, the antenna beam may be directed towards the first end of the transmit waveguide, e.g. a face side of the first end, wherein the first end of the transmit waveguide is in proximity to the transmit antenna and the second end of the transmit waveguide is in proximity of the movable part. Hence, the generated the radio signal may be radiated from the transmit antenna into the transmit waveguide.

Correspondingly, for the receive antenna its antenna beam may be directed towards the second end of the receive waveguide, e.g. a face side of the second end, wherein the second end of the receive waveguide is in proximity to the receive antenna and the first end of the receive waveguide is in proximity to the movable part. Hence, the reflected radio signal may be captured by the receive antenna.

The coupling of the radio signal from the transmit antenna to the transmit waveguide and/or the coupling of the reflected radio signal from the receive waveguide to the receive antenna may be accomplished either by far field coupling, by near field coupling, or by proximity coupling.

Figure 6:
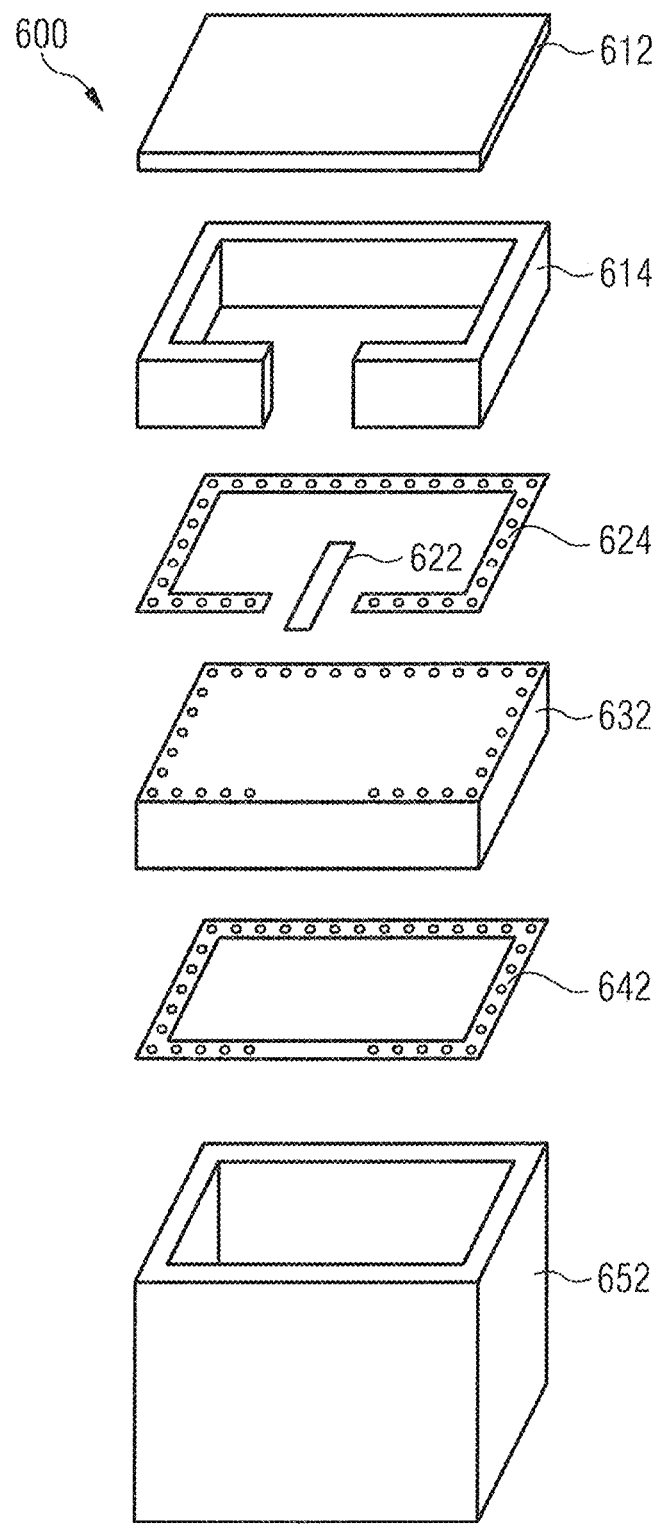
FIG. 6 illustrates an example of a field coupling structure from a circuit board to a hollow rectangular waveguide.

According to an example of the present disclosure, FIG. 6 shows a possible implementation of a field coupling structure 600 from a circuit board to a hollow rectangular waveguide 652, which may be either a transmit waveguide, e.g. the transmit waveguide 232/432, or a receive waveguide, e.g. the receive waveguide 234/434. The hollow rectangular waveguide 652 may be a metallic or a plastic waveguide. In another embodiment, it may alternatively be a solid waveguide, for example a solid rectangular, but also a solid circular, plastic waveguide, similar to the solid circular waveguide 330.

The field coupling structure 600 comprises a microstrip antenna 622, which may be a transmit antenna of a transmitter circuit similar to the transmitter circuit 222/422, or a receive antenna of a receiver circuit similar to the receiver circuit 224/424. Alternatively, it may be a transceive antenna configured to radiate the radio signal generated by the transmitter circuit and configured to capture the reflected radio signal. The microstrip antenna 622 may be arranged on a top layer of a circuit board, e.g. on top of a dielectric substrate 632. The top layer also comprises a grounded top conductor pattern 624, which is in shape of an opened rectangular frame and which partially surrounds the microstrip antenna 622.

The top conductor pattern 624 is electrically connected to a top rectangular waveguide 614, e.g. the dimensions of the top conductor pattern 624 match the cross section of the top rectangular waveguide 614. At an end of the top rectangular waveguide 614 far from the microstrip antenna 622, the top rectangular waveguide 614 may be short circuited by a conductive cap 612. The top rectangular waveguide 614 and the conductive cap 612 may be configured to prevent an electromagnetic wave associated with the generated radio signal or the reflected radio signal from being radiated into a space above the microstrip antenna. Thus, the top rectangular waveguide 614 and the conductive cap 612 may reduce radiation losses of the generated radio signal and/or the reflected radio signal.

In addition, the top conductor pattern 624 is electrically connected by via through-holes through the dielectric substrate 632 to a grounded bottom conductor pattern 642, which is in shape of a rectangular frame and whose dimensions match the cross section of the hollow rectangular waveguide 652. Hence, the top conductor pattern 624, the bottom conductor pattern 642, and the via through-holes, that electrically connect the top conductor pattern 624 with the bottom conductor pattern 642, form a rectangular substrate integrated waveguide, that connects the hollow rectangular waveguide 652 with the top rectangular waveguide 614. In other words, the hollow rectangular waveguide 652, the substrate integrated waveguide, and the top rectangular waveguide 614 form an entire waveguide, into which the microstrip antenna 622 is inserted to radiate the generated radio signal and/or to capture the reflected radio signal. A maximum coupling between the microstrip antenna 622 and the hollow rectangular waveguide 652 may be determined by tuning the length of the microstrip antenna 622.

According to another example of the present disclosure, FIG. 7 shows possible implementation of a proximity coupling structure 700 from a circuit board to a hollow circular waveguide 752, which may be either a transmit waveguide, e.g. the transmit waveguide 232/432, or a receive waveguide, e.g. the receive waveguide 234/434. The hollow circular waveguide 752 may be a metallic or a plastic waveguide. In another embodiment, it may alternatively be a solid waveguide, for example a solid circular, plastic waveguide, similar to the solid circular waveguide 330.

The proximity coupling structure 700 may be employed to couple a radio signal generated by a transmitter circuit, e.g. the transmitter circuit 222/422, into the transmit waveguide and and/or to capture a reflected radio signal from the receive waveguide and provide the reflected radio signal to a receiver circuit, e.g. the receiver circuit 224/424. Furthermore, the proximity coupling structure 700 may be used for coupling a transceive antenna to a transceive waveguide.

The proximity coupling structure 700 comprises a microstrip line 722, which may be arranged on a top layer of a printed circuit board, e.g. on top of a dielectric substrate 732. The microstrip line 722 may be inserted into a slot of a grounded top conductive plane 724 that may as also be on top of the dielectric substrate 732. The top conductive plane 724 is electrically connected with a grounded bottom conductive plane 742 by a set of conductive via through-holes, which are arranged in the shape of a circle. The bottom conductive plane 742 may also serve as a ground plane for the microstrip line 722. Furthermore, the top conductive plane 724, the set of conductive via through-holes, and the bottom conductive plane 742 may form a substrate integrated circular waveguide.

The bottom conductive plane 742 further comprises a circular opening, whose dimensions match the dimensions of the core of the hollow circular waveguide 752. The circular opening is aligned with the core of the hollow circular waveguide 752. Inside the circular opening of the bottom conductive plane 742, the proximity coupling structure 700 comprises a circular patch antenna 744, e.g. the circular patch antenna 744 is patterned on the bottom of the dielectric substrate 732.

The circular patch antenna 744 may be a transmit antenna of the transmitter circuit. In this case, the microstrip line 722 may be connected to an output of the transmitter circuit that provides the generated radio signal. The microstrip line 722 may hence couple the generated radio signal through the substrate integrated circular waveguide to the circular patch antenna 744, which then transmits the radio signal into the hollow circular waveguide, e.g. the transmit waveguide.

Alternatively, the circular patch antenna 744 may be a receive antenna of the receiver circuit. In this case, the circular patch antenna 744 may capture the reflected radio signal, which may arrive at the circular patch antenna 744 from the movable part after having been guided through the hollow circular waveguide 752, e.g. in this case the receive waveguide. The circular patch antenna 744 may then couple the reflected radio signal through the substrate integrated circular waveguide to the microstrip line 722, which may be connected to an input of the receiver circuit. Consequently, the receiver circuit may receive the reflected radio signal.

According to yet another example of the present disclosure, the circular patch antenna 744 may be a transceive antenna configured to transmit the radio signal into the hollow circular waveguide 752, e.g. a transceive waveguide in this example, and to capture the reflected radio signal from the hollow circular waveguide 752.

Figure 8:
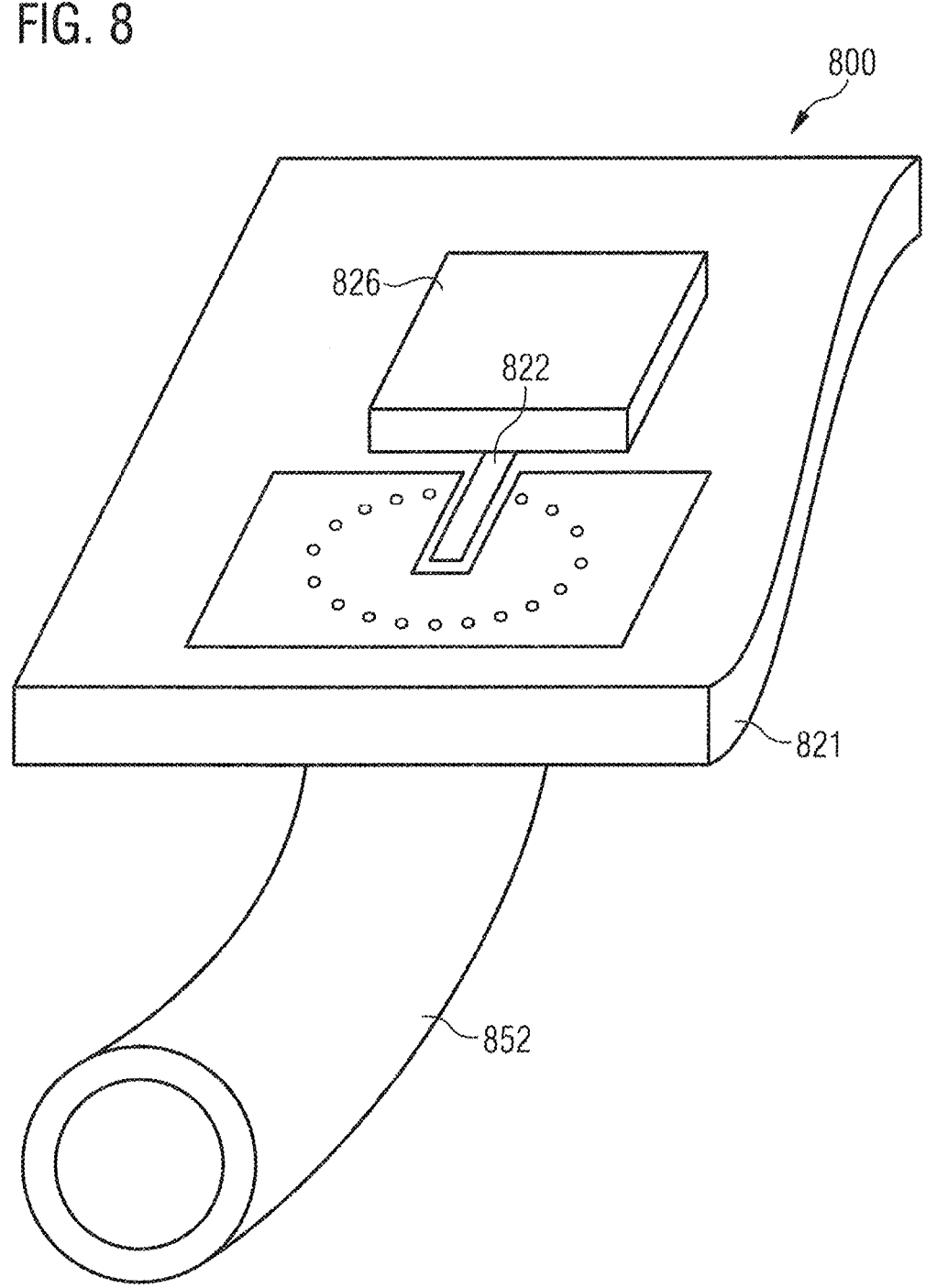
FIG. 8 illustrates an example of a transceive waveguide coupled to an integrated transceiver circuit mounted on a circuit board.

According to a possible implementation of a sensor apparatus 800 of the present disclosure, FIG. 8 illustrates in more detail the use of a transceive waveguide 852, which may be similar to the hollow circular waveguide 752. In this example, an integrated transceiver circuit 826 is mounted on top of a printed circuit board 821. In addition, it may be electromagnetically shielded by a shielded housing, for example a shielded housing comprising a top cover similar to the top cover 442, and a bottom cover, similar to the bottom cover 444. The integrated transceiver circuit 826 may comprise a transmitter portion configured to generate a radio signal. It may further comprise a receiver portion configured to receive a radio signal reflected from a movable part and to sense a position and/or a speed of the movable part based on at least the received reflected radio signal. Moreover, the integrated transceiver circuit 826 may comprise a bidirectional port, which is configured to provide the generated radio signal to a microstrip line 822 and which is configured to receive the reflected radio signal from the microstrip line 822. The microstrip line 822 may be comprised by a proximity coupling structure, similar to the proximity coupling structure 700. Thus, the integrated transceiver circuit 826 may transmit the generated radio signal via a proximity coupling structure into the transceive waveguide 852, and may receive the radio signal reflected from the movable part from the transceive waveguide 852 via the same proximity coupling structure.

According to some embodiments, the integrated transceiver circuit 826 may additionally comprise a duplexer. The duplexer may be configured to transfer the generated radio signal from the transmitter portion to the microstrip line 822, and may be configured to transfer the reflected radio signal from the microstrip line 822 to the receiver portion. That is to say, the duplexer may split the generated radio signal and the reflected radio signal. It may be integrated into the integrated transceiver circuit 826 or may be coupled between the integrated transceiver circuit 826 and the microstrip line 822. In the latter case, the integrated transceiver circuit 826 may comprise a dedicated output for the generated radio signal and a dedicated input for receiving the reflected radio signal.

According to some examples of the present disclosure, the duplexer may comprise a radio frequency (RF) switch, for example a single-pole-double-through switch, which may be realized in CMOS technology or by fast switching RF diodes, such as pin-diodes (positive-intrinsic-negative diodes). Additionally or alternatively, the duplexer may comprise an RF circulator, a power divider, such as a Wilkinson divider, a directional coupler, and/or RF isolators.

According to an embodiment employing a transceive waveguide, the splitting of the generated radio signal and the reflected radio signal may alternatively be performed within the transceive waveguide. For this purpose, the transceive waveguide may comprise a directive splitter. The directive splitter may be configured to couple the radio signal from the transmitter portion of an integrated transceiver circuit or from a transmitter circuit into the transceive waveguide. Moreover, the directive splitter may be configured to couple the reflected radio signal out of the transceive waveguide to a receiver portion of the transceiver circuit or to a receiver circuit.

Figure 9:
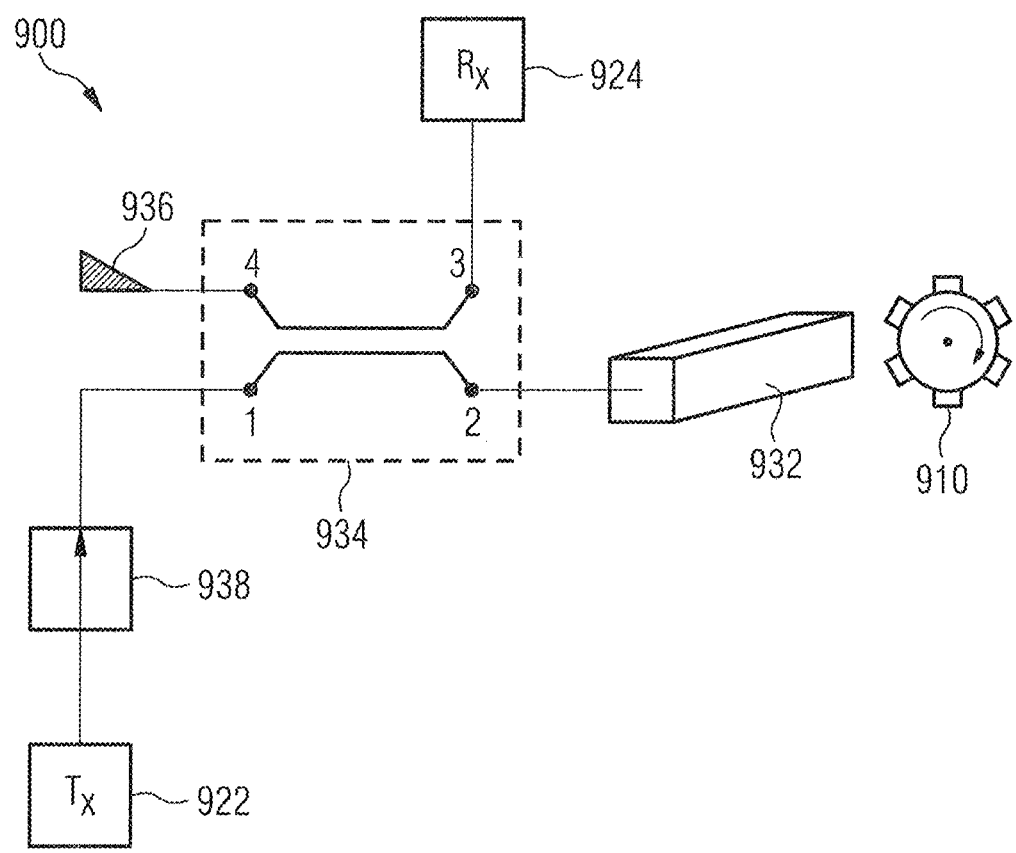
FIG. 9 shows a block diagram of an exemplary directive splitter.

FIG. 9 shows a block diagram of a possible implementation comprising a directive splitter 900, which may be comprised by a transceive waveguide. The transceive waveguide comprises a waveguide section 932. A directional coupler 934, a termination load 936, and a microwave isolator 938 may be implemented in waveguide form and may thus be comprised additionally by the transceive waveguide. A transmitter circuit 922 may be a transmitter portion of a transceiver circuit or a dedicated transmitter circuit. The receiver circuit 924 may be a receiver portion of a transceiver circuit or a dedicated receiver circuit. The transmitter circuit 922 may generate a radio signal and send it through the microwave isolator 938 to a first port of the directional coupler 934. The microwave isolator 938 may be configured to transfer signals only in the direction from the transmitter circuit 922 to the first port of the directional coupler 934 and absorb signals coming from the first port of the directional coupler 934 towards the transmitter circuit 922. At the directional coupler 934, a first portion of the generated radio signal, e.g. a share of the radio signals energy, may be transferred from the first port to a second port of the directional coupler 934, which may be connected to the waveguide section 932. A third port of the directional coupler 934, which is connected to the receiver circuit 924, may be isolated from the first port, e.g. the generated radio signal coming from the transmitter circuit 922 may be decoupled from the receiver circuit 924. A second portion of the generated radio signal may be coupled to a fourth port of the directional coupler 934 and be absorbed in the termination load 936, which is connected to the forth port.

The waveguide section 932 may then guide the first portion of the generated radio signal into a close proximity of a movable part 910, e.g. within a distance shorter than 5 cm, and emit the first portion of the generated radio signal towards the movable part 910. The movable part 910 may reflect the first portion of the generated radio signal towards the waveguide section 932, e.g. to the transceive waveguide. The waveguide section 932 may capture the reflected radio signal and guide it to the second port of the directional coupler 934. Here, a first portion of the reflected radio signal may be coupled via the third port of the directional coupler 934 to the receiver circuit 924, whereas a second portion of the reflected radio signal may be transferred to the first port of the directional coupler 934 and hence be absorbed in the microwave isolator 938. This may avoid an interference with the radio signal generated by the transmitter circuit 922 and may also avoid a reflection of the second portion of the reflected radio signal at the transmitter circuit 922 due to mismatch. The fourth port of the directional coupler 934 may be isolated from the second port. The receiver circuit 924 may then sense a position and/or a speed of the movable part 910 based on at least the received first portion of the radio signal reflected from the movable part.

Alternatively, the directional coupler may be realized by microstrip line structures or by hollow waveguide technologies.

Figure 10A:
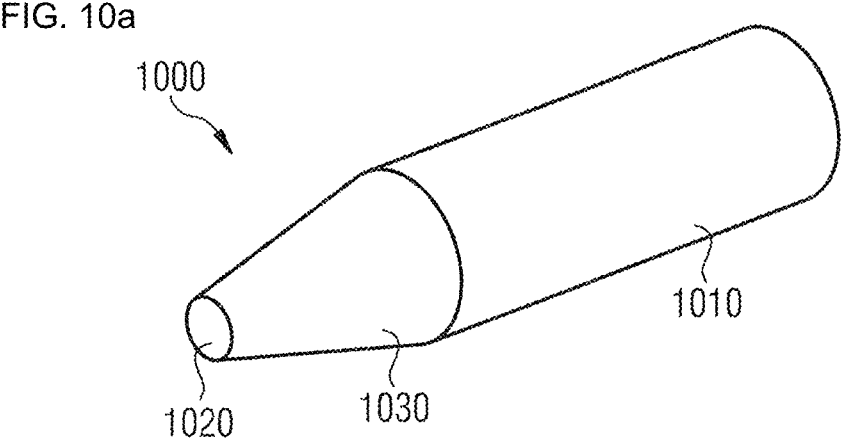
FIGS. 10a, b display examples of field transition couplers.

FIGS. 10a and b display two possible examples of field transition couplers, e.g. a tapered field transition coupler 1000 and a stepped field transition coupler 1050, which may be comprised by some implementations of the present disclosure. Field transition couplers may be divided into transmit field transition couplers, receive field transition couplers, and transceive field transition couplers. Transmit field transition couplers may enhance coupling of a generated radio signal, e.g. reduce coupling losses, from a transmitter circuit to a transmit waveguide. Receive field transition couplers may enhance coupling of a radio signal, which is reflected from a movable part, from a receive waveguide to a receiver circuit, whereas transceive field transition couplers may enhance coupling of the generated radio signal and the reflected radio signal between a transceiver circuit and a transceive waveguide. Subsequently, the principles of a transmit field transition coupler will be explained in more detail, however, to the skilled person these principles may be transferred to receive field transition couplers and/or transceive field transition couplers.

For example, a transmit field transition coupler may be located at the first end of a transmit waveguide, e.g. the transmit waveguides 1010 and 1060, which may have a circular cross section and may, for instance, be hollow or solid plastic waveguides. At the face side, a transmit field transition coupler may have a cross section of different shape and of different dimensions than the cross section of the transmit waveguide. If the transmitter circuit comprises a transmit antenna, the cross section of the transmit field transition coupler may be adapted to the shape and the dimensions of the transmit antenna and thus be configured to couple the radio signal radiated from the transmit antenna at a low coupling loss into the transmit waveguide. For example the coupling loss may amount to a value between 2 dB and 5 dB.

In case of the tapered field transition coupler 1000, its cross section at the face side 1020 close to the transmitter circuit (or the transmit antenna) may gradually be transformed into the cross section of the transmit waveguide 1010. For this purpose the tapered field transition coupler 1000 comprises a conical taper 1030. The length of the conical taper 1030 may be tuned such that the coupling loss is minimized.

In case of the stepped field transition coupler 1050, its cross section at the face side 1070 close to the transmitter circuit (or the transmit antenna) may stepwise be transformed into the cross section of the transmit waveguide 1060. The stepped field transition coupler 1050 may for example comprise a first field transition section 1072 with a rectangular cross section and a second field transition section 1074 with a circular cross section. The first field transition section 1072 may be configured to capture a linearly polarized radio signal, which may be provided by the transmitter circuit or the transmit antenna. The second field transition section 1074 may be configured to match a characteristic impedance of the first field transition section 1072 to a characteristic impedance of the transmit waveguide 1060. Moreover, the second field transition section 1074 may be configured to mechanically and electrically couple the first field transition section 1072 and the transmit waveguide 1060. For instance, the second field transition section 1074 may comprise an aperture 1076, e.g. a jack, into which the transmit waveguide 1060 may be inserted.

In a few embodiments of the present disclosure, the coupling of the generated radio signal from the transmitter circuit into the transmit waveguide, the coupling of the reflected radio signal from the receive waveguide to the receiver circuit, and/or the coupling of the generated radio signal and of the reflected radio signal between a transceiver circuit and a transceive waveguide may, alternatively to employing a transmit antenna, a receive antenna and/or a transceive antenna, respectively, comprise the use of a coaxial-to-waveguide transition. For example, the transmitter circuit may generate a radio signal and provide the radio signal to a coaxial output, e.g. a coaxial connector, which may for example be an N-, SMA-, K-, V-, or 1-mm-connector. The coaxial connector may then be connected to the transmit waveguide via a coaxial-to-waveguide transition, e.g. a coaxial-to-waveguide adaptor.

According to some exemplary implementations, the transmit waveguide may comprise a transmit aperture configured to emit the radio signal towards the movable part, whereas the receive waveguide may comprise a receive aperture configured to capture the reflected radio signal from the movable part. As transmit apertures and receive apertures may have similar structures, only receive apertures are subsequently explained in more detail. For skilled person, the explanations may be transferred to transmit apertures or also to transceive apertures, which may be comprised by a transceive waveguide and may be configured to emit the radio signal towards a movable part and to capture the reflected radio signal from the movable part.

A receive aperture may be located at the first end of a receive waveguide, the first end being close to the movable part, e.g. within a distance of at most 5 cm. The receive aperture may comprise an antenna, e.g. a horn antenna, a planar antenna, such as a microstrip antenna, a patch antenna or a planar dipole antenna, or a rod antenna, such as a dipole antenna or a frame antenna. In some embodiments, the receive aperture may be formed by leaving the first end of the receive waveguide open.

A receive aperture in form of a horn antenna may be implemented by tapering the receive waveguide at the first end, e.g., gradually enlarging the cross section of the receive waveguide.

Figure 11A:
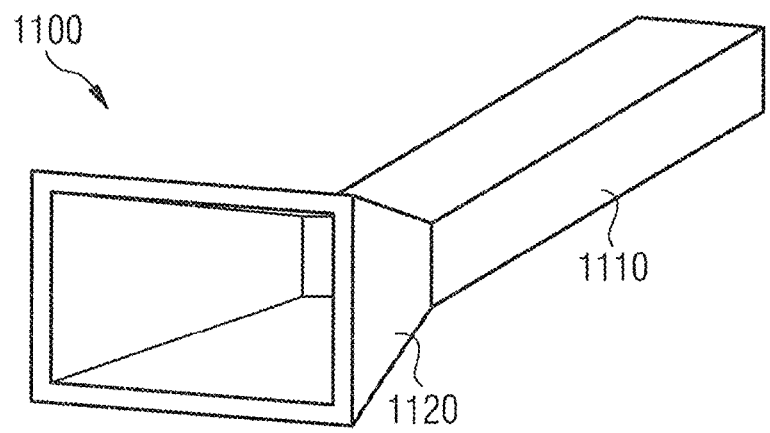
FIG. 11a, b show exemplary implementations of receive apertures.
Figure 11B:
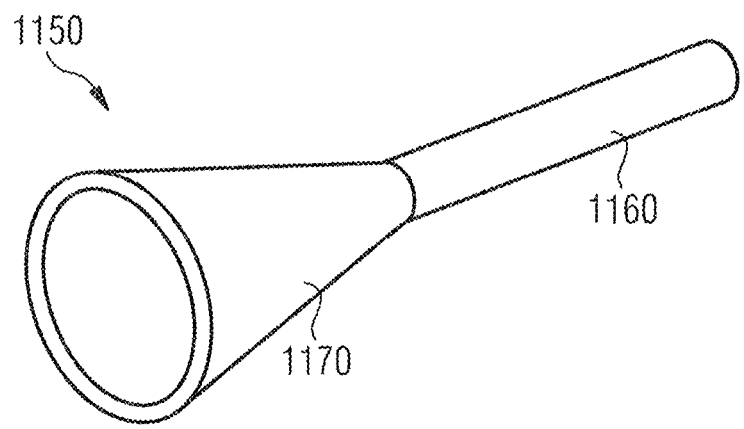

FIGS. 11a and b illustrate two exemplary implementations of receive apertures 1100, 1150 comprising horn antennas according to some possible embodiments of the present disclosure. As shown in FIG. 11a, if the receive waveguide comprises a rectangular waveguide 1110, similar to the hollow rectangular waveguide 310, pyramidal horn antenna 1120 may be suitable to capture the radio signal reflected from the movable part and to couple the captured reflected radio signal into the rectangular receive waveguide 1110. In FIG. 11b the receive waveguide comprises a circular waveguide 1160, which may be a hollow circular waveguide similar to the hollow circular waveguide 320, or a solid circular waveguide similar to the solid circular waveguide 330. For a circular receive waveguide 1160 a conical horn antenna 1170 may suitable to capture the radio signal reflected from the movable part and to couple the captured reflected radio signal into the circular receive waveguide. For enhanced reception of the reflected radio signal the horn antennas, e.g. the pyramidal horn antenna 1120 and/or the conical horn antenna 1170, may face the movable part.

According to some embodiments and alternatively to a horn antenna, a planar antenna may be employed for capturing the reflected radio signal. The planar antenna may be attached to the face side of the receive waveguide's first end facing the movable part, e.g. by printing, gluing, or by using an adaptor, e.g. a waveguide transition, that may be fitted onto the first end and couple the reflected radio signal from the planar antenna into the receive waveguide. In case of a rod antenna, the rod antenna may be partially inserted into a core of the receive waveguide, for example by plugging, and may thus be used to capture the reflected radio signal from the movable part.

Some embodiments of the present disclosure target a cost reduction, e.g. a reduction of radar speed sensors, which may, for instance, comprise transmitter circuits, receiver circuits, and/or transceiver circuits, by a centralization of a transmitter circuit and a receiver circuit, which may be comprised by a radar integrated circuit (radar IC), and be in an electronic environment, e.g. a shielded housing, that provides a protected supply voltage, e.g. a supply voltage filtered from interference signals and/or other spurious alternating voltages, in order to avoid high voltage compliance and high levels of electrostatic discharge (ESD) protection, which might not be available or be costly in technologies that are capable to operate in a radar frequency range.

Figure 12A:
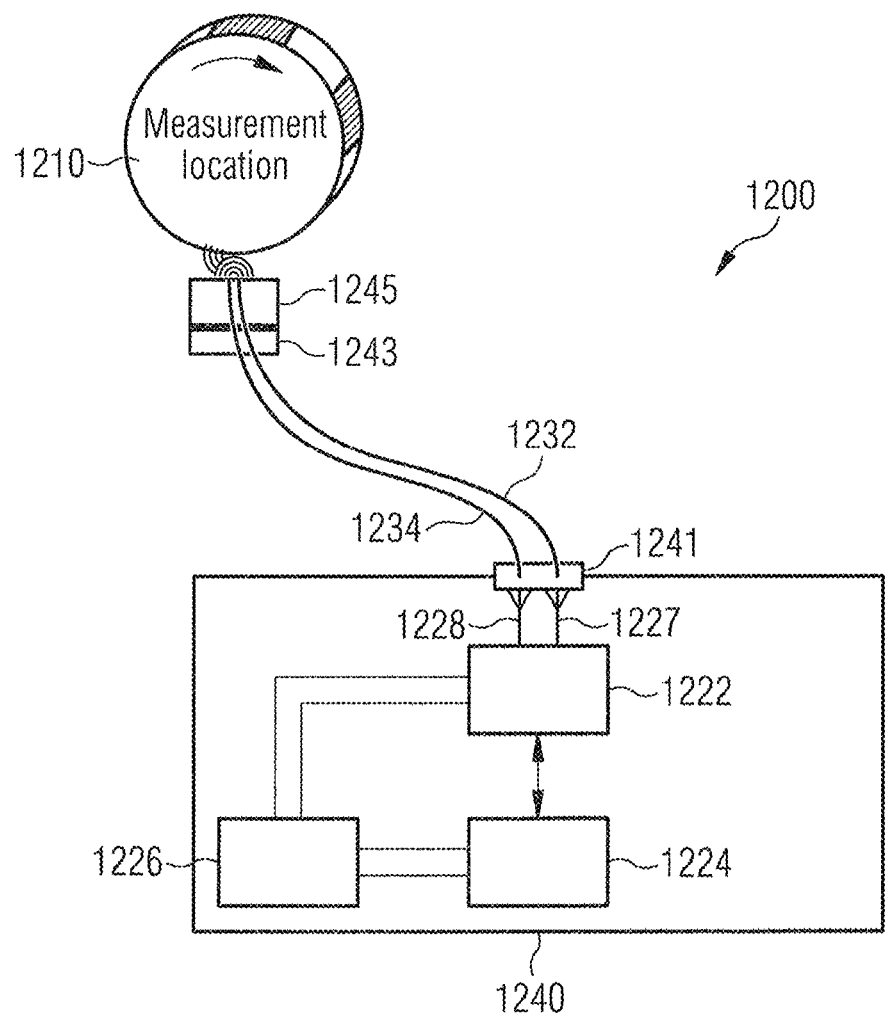
FIG. 12a, b show possible implementations of sensor apparatuses for determining a position and/or a speed of a movable part.

FIG. 12a shows a possible embodiment of a sensor apparatus 1200 for determining a position and/or a speed of a movable part 1210. The sensor apparatus 1200 comprises a radar IC 1222, whose functionality may be unmodified. The radar IC may be arranged inside a protected electronic environment, e.g. a shielded housing 1240, together with a supply circuit 1226 and an evaluation and control circuit 1224. The radar IC 1222 may comprise a transceiver circuit, which has a transmitter portion and a receiver portion. It may generate a radio signal and couple the radio signal, e.g. its wave, via a transmit antenna 1227 into a transmit waveguide 1232, which may, for instance, be a plastic fiber or a plastic hollow or solid circular waveguide. The transmit waveguide 1232 transports the radio signal to a measurement location, e.g. the movable part 1210, where the radio signal, e.g. the wave, leaves the transmit waveguide 1232, e.g. the fiber, and expands into the space in front. In other words, the radio signal is emitted from the transmit waveguide 1232 towards the movable part 1210. Once the radio signal reaches the target, e.g. the movable part 1210, it is reflected and a part of the reflected wave, e.g. a share of the energy of the radio signal reflected from the movable part, reaches a second waveguide, e.g. a receive waveguide 1234, which leads it back to a receiver, e.g. the receiver portion of the radar IC 1222. The reflected radio signal may couple from the receive waveguide 1234 to the receiver portion of the radar IC 1222 via a receive antenna 1228. The transmit antenna 1227 and the receive antenna 1228 can be located, e.g. integrated, on the radar IC 1222 or can be printed on a printed circuit board, on which the radar IC 1222 may be mounted. Optionally, the transmit waveguide 1232 and the receive waveguide 1234 may be coupled to a connector or a feed 1241 to pass the shielded housing 1240. Furthermore, the transmit waveguide 1232 and the receive waveguide 1234 may be held by a fixture 1245, such that they may face the movable part 1210, and they may optionally be connected to the fixture by a connector 1243.

According to some embodiments, a machine (e.g., the machine 200 of FIG. 2) comprising the sensor apparatus 1200 (or sensor apparatuses similar to the sensor apparatus 1200) can further comprise a machine housing (not shown in FIG. 12a). The machine housing (e.g. a combustion engine housing or a transmission box housing) can be configured to house the moveable part 1210. Furthermore, the machine housing can comprise the fixture 1245. The fixture 1245 can be configured to receive the transmit waveguide 1232 and/or the receive waveguide 1234 (or alternatively a transceive waveguide) and to direct an end of the at least one received waveguide (e.g., the transmit waveguide 1232 and/or the receive waveguide 1234 or the transceive waveguide) towards the movable part 1210. In this way, the radio signal emitted from the transmit waveguide 1232 can be focused onto the movable part 1210 and/or the reflected radio signal can be more reliably received by the receive waveguide 1234.

The radar IC 1222 (e.g., a transmitter circuit and a receiver circuit), the supply circuit 1226, and the evaluation and control circuit 1224 can be outside the mechanical machine housing and can be optionally inside the shielded housing 1240. The transmit waveguide 1232 can then guide the radio signal from the radar IC 1222 inside shielded housing 1240 to the movable part 1210 inside the machine housing, while the receive waveguide 1234 can guide the reflected radio signal from the movable part 1210 back to the radar IC 1222. At least one of the transmit waveguide 1232 and the receive waveguide 1234 can comprise a solid plastic waveguide, which can be flexible and hence easily routed between the radar IC 1222 and the movable part 1210. In addition, using solid plastic waveguides can save costs for the transmit waveguide 1232 and/or the receive waveguide 1234.

Optionally, the fixture 1245 can be inserted in an opening of the machine housing and can be mounted on the machine housing. The at least one waveguide (e.g., the transmit waveguide 1232 and/or the receive waveguide 1234 or a transceive waveguide) received by the fixture 1245 can be inserted into the fixture from outside the machine housing. An end of the fixture inside the machine housing can be transparent for the radio signal.

The fixture 1245 can comprise an outer shell and filling material inside the outer shell. The outer shell can comprise means (e.g., a flange together with screws, bolts, rivets, nuts and/or washers) to be mounted on the machine housing. Inside the outer shell, the filling material can surround the at least one received waveguide 1232, 1234 and hold the received waveguide 1232, 1234 in place. The outer shell can comprise at least one opening at the end of the fixture inside the machine housing. The at least one received waveguide may be fed through this opening into the machine housing so that the radio signal can be emitted from the end of the received waveguide 1232, 1234 towards the movable part 1210 and/or so that the reflected radio signal can be received by the end the received waveguide 1232, 1234.

Alternatively, the received waveguide 1232, 1234 may end inside the fixture 1245. The fixture 1245 can then further comprise at least one dielectric lens attached to its end inside the machine housing. The dielectric lens can be directed towards the movable part 1210 and can be electromagnetically coupled to the at least one received waveguide 1232, 1234. For example, the outer shell of the fixture can comprise an opening inside the machine housing. The dielectric lens can cover this opening, while the at least one received waveguide 1232, 1234 may end inside the fixture behind the dielectric lens (e.g., be attached to the dielectric lens) or may be electromagnetically coupled to the dielectric lens via a hollow waveguide located inside the filling material of the outer shell. For example, the at least one received waveguide 1232, 1234 may be a solid plastic waveguide, that is partially fed into the hollow waveguide inside the filling material of the outer shell or that is attached to the dielectric lens inside the fixture 1245.

If the dielectric lens is electromagnetically coupled to the transmit waveguide 1232 (or a transceive waveguide), the dielectric lens can be configured to focus the radio signal from the transmit waveguide 1232 onto the movable part 1210. If the dielectric lens (or an additional dielectric lens) is electromagnetically coupled to the receive waveguide 1234, the dielectric lens (or the additional dielectric lens, respectively) can be configured to collect the reflected radio signal and to provide the reflected radio signal to the receive waveguide 1234.

Figure 20A:
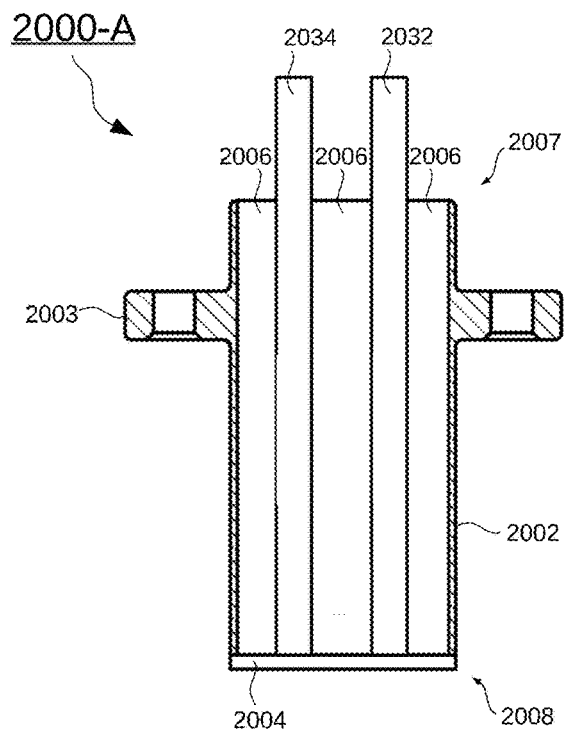
FIGS. 20a-g show fixtures used for holding a waveguide in place in proximity to a movable part.

FIG. 20a shows an exemplary fixture 2000-A. The fixture 2000-A can be used to bring a radar waveguide (e.g., a transmit waveguide, a receive waveguide, and/or a transceive waveguide) into proximity of a movable part (e.g., a tooth wheel) through a machine housing. For example, a centrally generated radio signal (e.g., generated by the transmitter circuit 222 of the machine 200 of FIG. 2) can be distributed to different movable parts via plastic fiber waveguides (e.g., solid plastic waveguides) or hollow waveguides. The fixture 2000-A can be used to feed the waveguide through the machine housing of a transmission box or an engine housing, for example.

The fixture 2000-A comprises a cylindrical outer shell 2002 with a flange 2003. The outer shell 2002 may comprise metal and/or plastic material. The fixture 2000-A can be inserted into an opening of the machine housing housing the movable part. With aid of the flange 2003, the fixture 2000-A can be mounted on the machine housing. A first end 2007 of the fixture 2000-A may then be located outside the machine housing, while a second end 2008 of the fixture 2000-A may be located inside the machine housing and be directed at the movable part. Both a transmit waveguide 2032 and a receive waveguide 2034 can be solid plastic waveguides (or fiberglass waveguides) and can be inserted into the fixture 2000-A (i.e., into the outer shell 2002) from the first end 2007. The outer shell 2002 comprises an opening at the second end 2008 of the fixture 2000-A. This opening is covered by a refractor 2004 (e.g., a dielectric lens or a dielectric cover transparent for radio signals). Inside the outer shell 2002, an end of the transmit waveguide 2032 and an end of the receive waveguide 2034 are attached to the refractor 2004. This way, the transmit waveguide 2032 and the receive waveguide 2034 can be electromagnetically coupled to the refractor 2004. The refractor 2004 may then focus a radio signal delivered by the transmit waveguide 2032 onto the movable part, capture a reflection of the radio signal from the movable part, and provide the reflected radio signal to the receive waveguide 2034.

Furthermore, the transmit waveguide 2032 and the receive waveguide 2034 are held in place inside the outer shell 2002 by a filling material 2006. The filling material 2006 can be a dielectric material with a dielectric constant that is smaller than a dielectric constant of the transmit waveguide 2032 and the receive waveguide 2034. This can reduce losses of the transmit waveguide 2032 and the receive waveguide 2034 when guiding the radio signal and the reflected radio signal, respectively, through the fixture 2000-A. The filling material 2006 may be potted into the outer shell 2002 to fix the positions of the transmit waveguide 2032 and the receive waveguide 2034 at the refractor 2004.

Figure 20B:
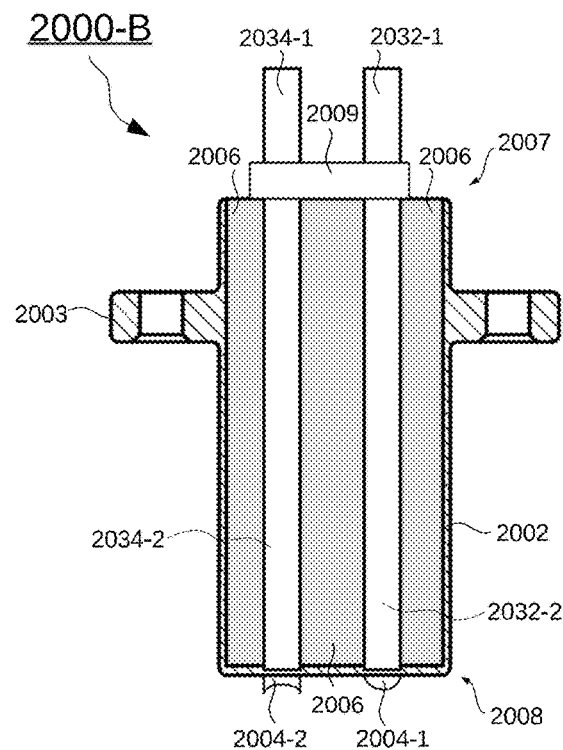

FIG. 20b shows another fixture 2000-B for directing a transmit waveguide and a receive waveguide at a movable part inside a machine housing. The fixture 2000-B may be similar to the fixture 2000-A of FIG. 20a. In contrast, however, an outer shell 2002 of the fixture 2000-B is filled with metal 2006 or the fixture 2000-B may alternatively be made from solid metal. The fixture 2000-B comprises a first and a second channel running through the metal 2006 from the first end 2007 (outside the machine housing) to the second end 2008 of the fixture 2000-B (inside the machine housing).

Figure 10B:
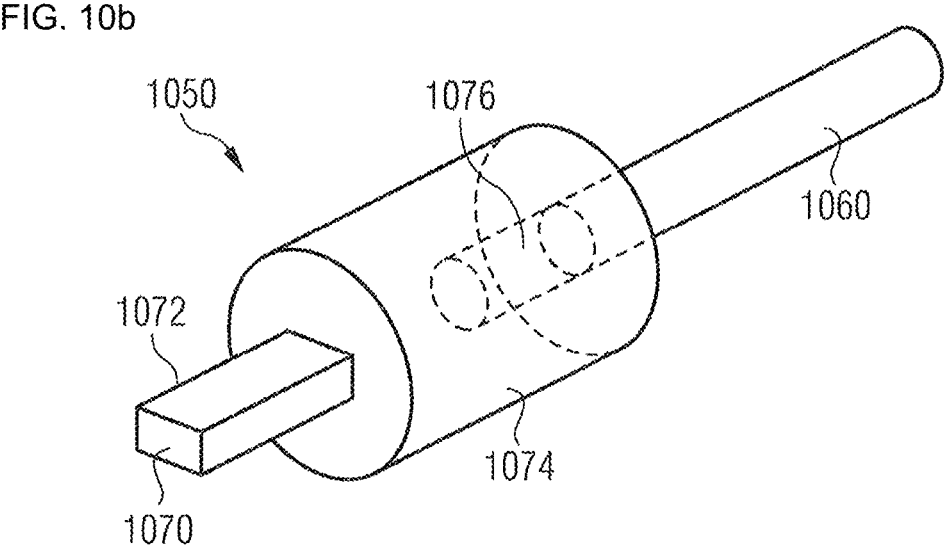

The transmit waveguide comprises a first solid plastic waveguide section 2032-1 and a second solid plastic waveguide section 2032-2. The first solid plastic waveguide section 2032-1 is connected to the second solid plastic waveguide section 2032-2 by a clamp 2009 at the first end 2007 of the fixture 2000-B outside the machine housing. The second solid plastic waveguide section 2032-2 is inserted in the first channel of the fixture 2000-B and is attached to a first dielectric lens 2004-1 at the second end 2008 of the fixture 2000-B. Lens 2004-1 acts as a field transition coupler or antenna. While the dielectric lens 2004-1 has a spherical shape with a convex surface in the illustrated example, also different geometries can be employed, such as tapered field transition couplers similar to FIG. 10. Depending on the geometry of the waveguide section 2032-2, a corresponding tapered field transition coupler or antenna could be of conical or pyramidal shape, for example.

Likewise, the receive waveguide comprises a first solid plastic waveguide section 2034-1 and a second solid plastic waveguide section 2034-2. The first solid plastic waveguide section 2034-1 of the receive waveguide is connected to its second solid plastic waveguide section 2034-2 by the clamp 2009 (or an additional clamp) at the first end 2007 of the fixture 2000-B. The second solid plastic waveguide section 2034-2 of the receive waveguide is inserted in the second channel of the fixture 2000-B and is attached to a second dielectric lens 2004-2 at the second end 2008 of the fixture 2000-B. The first and the second dielectric lens 2004-1, 2004-2 can be directed at the movable part inside the machine housing.

Figure 20C:
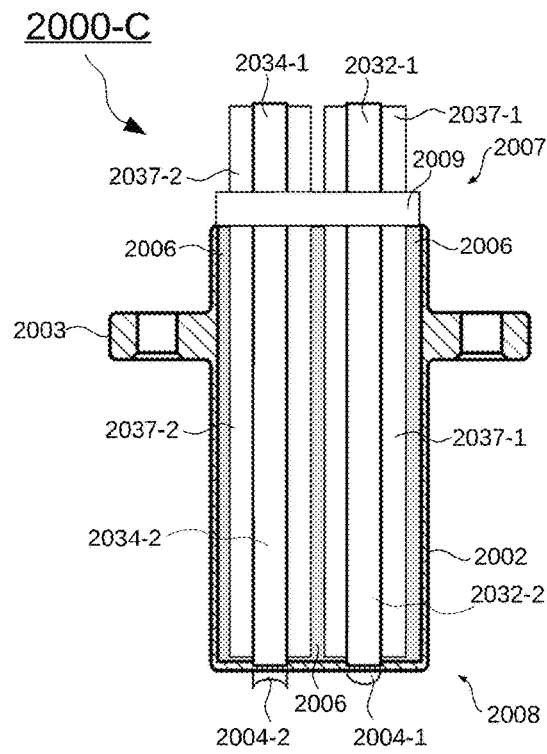

FIG. 20c shows another fixture 2000-C similar to the fixture 2000-B of FIG. 20b. Compared to the fixture 200-B, the channels of the fixture 2000-C running through the metal 2006 are made wider, so that the transmit waveguide and the receive waveguide can be additionally coated with respective dielectric foam tubes or metal coats 2037-1, 2037-2. The dielectric foam tubes 2037-1, 2037-2 can have a dielectric constant that is smaller than a dielectric constant of the transmit waveguide and the receive waveguide. This can reduce loss of the transmit waveguide and the receive waveguide when guiding the radio signal and the reflected radio signal, respectively, through the fixture 2000-C.

Figure 20D:
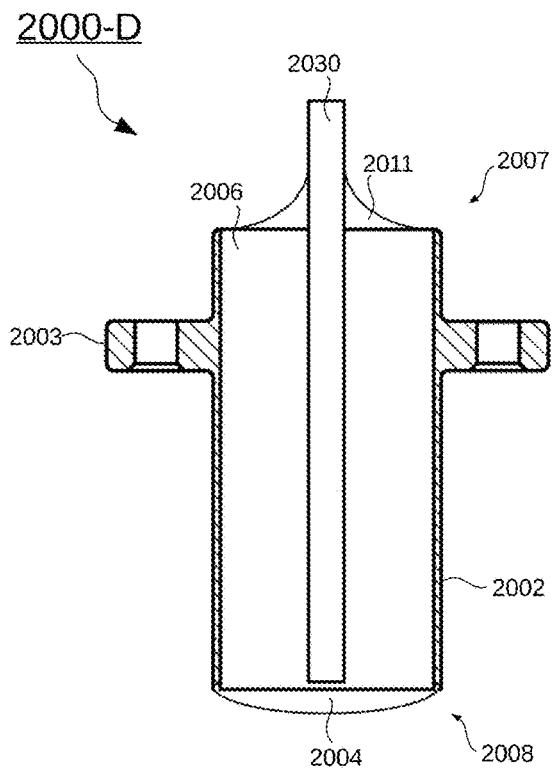

FIG. 20d shows another fixture 2000-D similar to the fixture 2000-A of FIG. 20a. In contrast to the fixture 2000-A, the fixture 2000-D is configured to receive only one waveguide 2030 (e.g., one transmit waveguide, or one receive waveguide, or one transceive waveguide). The received waveguide 2030 can be a solid plastic waveguide (e.g., a fiberglass waveguide) and can run along a central axis of the fixture 2000-D. Furthermore, the received waveguide 2030 is held in position by a dielectric filling material 2006 that surrounds the received waveguide 2030 and has a dielectric constant smaller than the dielectric constant of the received waveguide 2030. At the first end 2007 of the fixture 2000-D, the received waveguide 2030 is glued to the fixture 2000-D (e.g., to the filling material 2006) with a glue having a dielectric constant smaller than the dielectric constant of the received waveguide 2030. At the second end 2008 of the fixture 2000-D, the received waveguide 2030 is coupled to a dielectric lens 2004. The dielectric lens 2004 can be directed at the movable part.

Figure 20E:
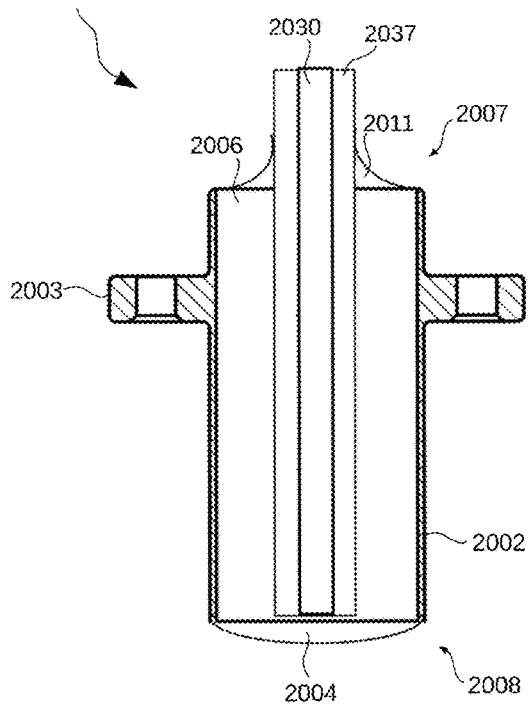

If a waveguide 2030 received by a fixture is optionally coated with a dielectric foam tube 2037 of a dielectric constant smaller than the dielectric constant of the received waveguide 2030, as shown for the fixture 2000-E of FIG. 20e, the dielectric filling material 2006 and/or the glue 2011 may be of any dielectric constant.

Figure 20F:
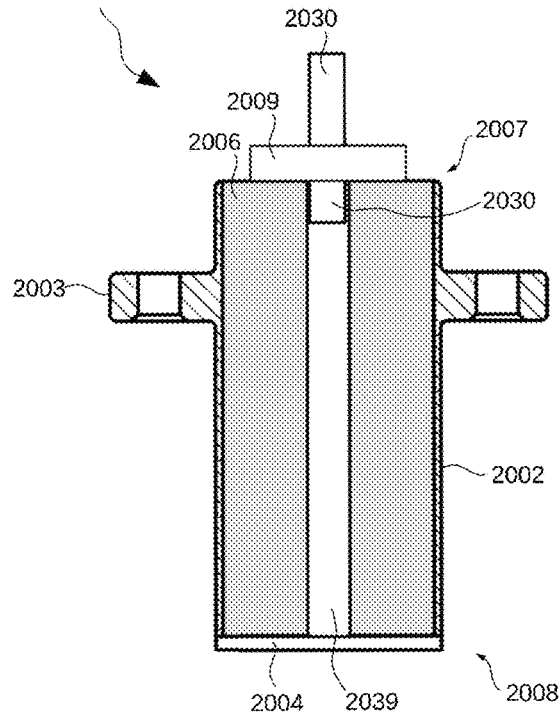

FIG. 20f shows yet another fixture 2000-F similar to the fixture 2000-D of FIG. 20d. An outer shell 2002 of the fixture 2000-F is filled with metal 2006. Alternatively, the fixture 2000-F may be made from solid metal. The fixture 2000-F comprises a hollow metallic waveguide 2039 running through the metal 2006 from the first end 2007 to the second end 2008 of the fixture 2000-F along a central axis of the fixture 2000-F. At the first end 2007, a waveguide (e.g., a solid plastic waveguide) received by the fixture 2000-D is plugged into the hollow metallic waveguide 2039 and held by the fixture 2000-F with a clamp 2009. At the second end 2008 of the fixture 2000-F, the hollow metallic waveguide 2039 is attached to a dielectric lens 2004 (or a dielectric cover transparent for radio signals).

Figure 20G:
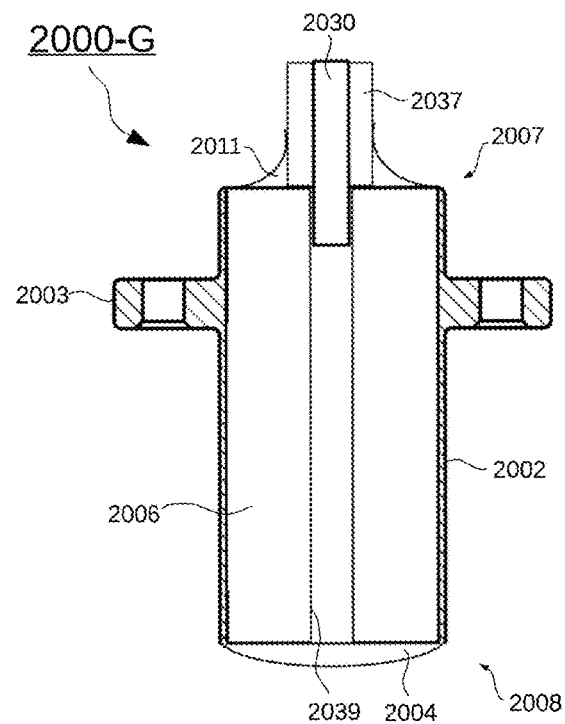

Alternatively, a hollow metallic waveguide 2039 may comprise a hollow metallic tube inserted into dielectric filling material of a fixture and running from a first end 2007 to a second end 2008 of the fixture. Such a fixture 2000-G is shown in FIG. 20g. At the first end 2007 of the fixture 2000-G, a waveguide 2030 (e.g., a solid plastic waveguide) received by the fixture 2000-G is partially inserted (e.g., plugged) into a metallic tube 2039 of the fixture 2000-G. The metallic tube 2039 is surrounded by dielectric filling material 2006, which can be of an arbitrary dielectric constant. Outside the fixture 2000-G, the received waveguide 2030 is coated by a dielectric foam tube or metal coat 2037. A dielectric constant of the dielectric foam tube 2037 is smaller than a dielectric constant of the received waveguide 2030. The received waveguide coated with the dielectric foam tube 2037 is attached to the fixture 2000-G with a glue (of an arbitrary dielectric constant).

Also design variants of the fixtures shown in FIGS. 20a-g with more than two dielectric waveguide cores are possible. This kind of structure (e.g., the fixtures shown in FIGS. 20a-g) may be directly connected to an ECU (electronic control unit) or may use longer fibers to be connected to it.

Figure 21A:
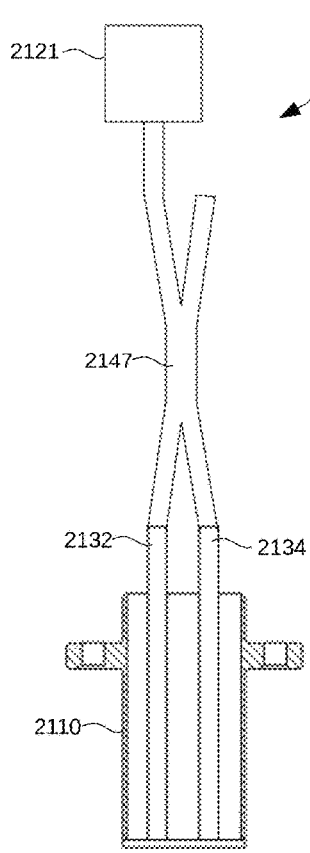
FIGS. 21a-b show sensor apparatuses comprising a fiber coupler.

FIG. 21a shows a sensor apparatus 2100-A configured to determine a position and/or a speed of a movable part (not shown). The sensor apparatus 2100-A comprises a transceiver circuit 2121, a transmit waveguide 2132, a receive waveguide 2134, a fixture 2110, and a fiber coupler 2147. The fiber coupler 2147 is employed for connecting the transmit waveguide 2132 and the receive waveguide 2134 to the transceiver circuit 2121. The transceiver circuit can comprise a transmitter circuit configured to generate radio signals and a receiver circuit configured to determine the position and/or the speed of the movable part based on (at least) a received reflected radio signal. The fixtures 2110 is configured to direct the transmit waveguide 2132 and the receive waveguide 2134 towards the movable part housed by a machine housing. The transceiver circuit 2121 is connected to a first port of the fiber coupler 2147. The transmit waveguide 2132 is connected to a second port of the fiber coupler 2147, the second port being electromagnetically coupled to the first port. Likewise, the receive waveguide 2134 is coupled to a third port of the fiber coupler 2147, the third port being also electromagnetically coupled to the first port and being electromagnetically isolated from the second port. A fourth port of the fiber coupler 2147 can be electromagnetically isolated from the first port and can be terminated by a characteristic impedance of the fiber coupler 2147 (e.g., 50 Ohm).

Figure 21B:
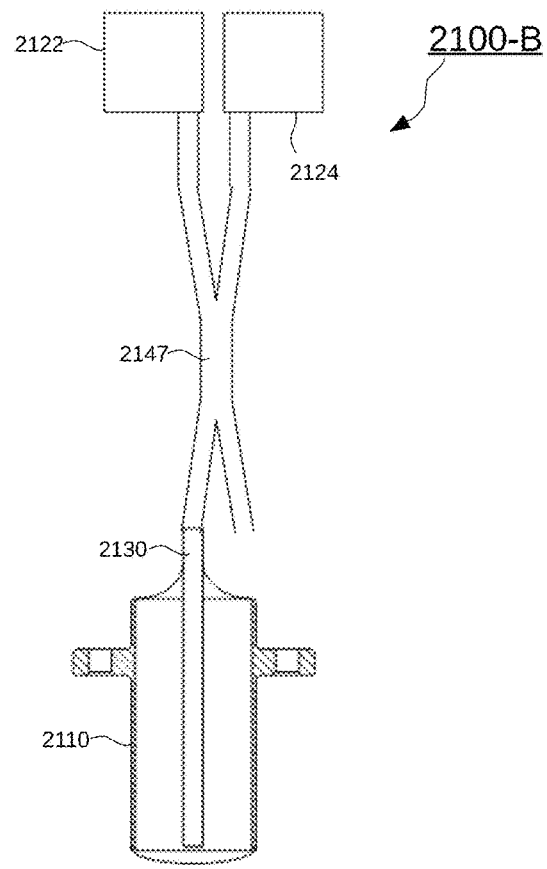

If alternatively a transceive waveguide 2130 is directed towards the movable part and held in place by a fixture 2110, as shown in FIG. 21b for the sensor apparatus 2100-B, the fiber coupler 2147 can be used for coupling the transceive waveguide 2130 to a transmitter circuit 2122 and a receiver circuit 2124 of the sensor apparatus 2100-B. To this end, the transceive waveguide 2130 is connected to a port of the fiber coupler 2147 that is electromagnetically coupled to two other ports of the fiber coupler 2147, wherein one of these ports is connected to the transmitter circuit 2122 and the other is connected to the receiver circuit 2124.

In other words, FIG. 21a shows a dielectric waveguide fiber coupler that can be used to connect sensing heads with multiple fibers to central radar units with combined transmit and receive channels. Likewise, a dielectric waveguide fiber coupler can be used to connect a sensing head with only one fiber to separated transmitters and receivers as shown in FIG. 21b.

According to some examples, a transmit waveguide and/or a receive waveguide (and/or a transceive waveguide) of a sensor apparatus can comprise a first solid plastic waveguide section and a second solid plastic waveguide section. Each solid plastic waveguide section can be coated by a respective dielectric foam tube having a dielectric constant lower than a dielectric constant of the first and the second solid plastic waveguide section. The dielectric foam tubes can protect the waveguide from environmental influences. Furthermore, the dielectric foam tubes can prevent other parts (of e.g. the machine, in which a sensor apparatus is installed in) from electromagnetically interacting with the waveguide and can hence prevent these parts from causing losses in the waveguide. By connecting at least two solid plastic waveguide sections with each other, the waveguide can be trimmed to a desired length suitable for the installation conditions in the machine.

For example, an end of the first solid plastic waveguide section can be connected to an end of the second solid plastic waveguide section by a fixture tube. The fixture tube can be configured to align a face side of the end of the first solid plastic waveguide section with a face side of the end of the second solid plastic waveguide section. This way, a radio signal can couple from the first solid plastic waveguide section to the second solid plastic waveguide (and vice versa).

Figure 22A:
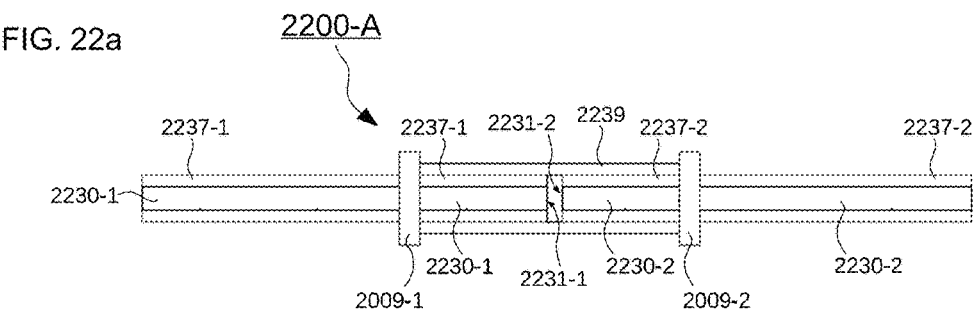
FIGS. 22a-b show joints between solid plastic waveguide sections employing a fixture tube.

FIG. 22a shows a joint 2200-A between a first solid plastic waveguide section 2230-1 and a second solid plastic waveguide section 2230-2. A face side 2231-1 of the first solid plastic waveguide section 2230-1 is aligned with a face side 2231-2 of the second solid plastic waveguide section 2230-2. Furthermore, the first solid plastic waveguide section 2230-1 is coated up to its face side 2231-2 with a first dielectric foam tube 2237-1. The second solid plastic waveguide section 2230-1 is coated up to its face side 2231-2 with a second dielectric foam tube 2237-2. A fixture tube 2239 of the joint 2200-A holds the face sides 2231-1, 2231-2 of the first and the second solid plastic waveguide sections 2230-1, 2230-2 in place relative to each other. The fixture tube 2239 surrounds the coated ends of the first and the second solid plastic waveguide sections 2230-1, 2230-2. A first clamp 2009-1 clamps the fixture tube 2239 to the end of the first solid plastic waveguide section 2230-1. A second clamp 2009-2 clamps the fixture tube 2239 to the end of the second solid plastic waveguide section 2230-2. Since the first and the second dielectric foam tube 2237-1, 2237-2 separate the fixture tube 2239 from the first and the second solid plastic waveguide section 2230-1, 2230-2, electromagnetic interaction between the fixture tube 2239 and the first and the second solid plastic waveguide section 2230-1, 2230-2 can be reduced (and/or avoided). The fixture tube 2239 may thus comprise a material of an arbitrary dielectric constant without causing losses in the first or the second solid plastic waveguide section 2230-1, 2230-2.

Figure 22B:
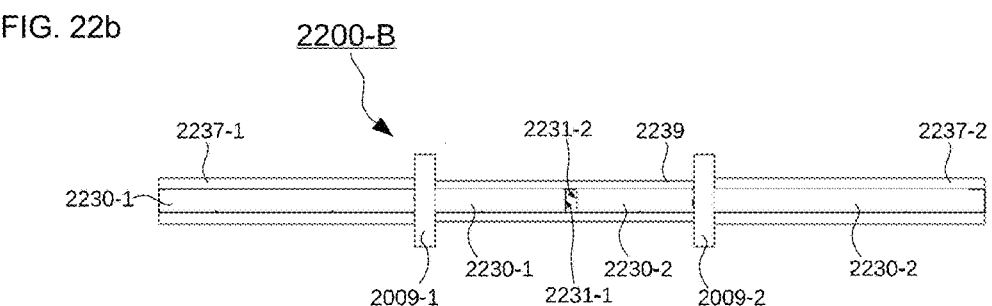

FIG. 22b shows an alternative joint 2200-B between a first solid plastic waveguide section 22301 and a second solid plastic waveguide section 2230-2. In the case of the joint 2200-B, the ends of the first and the second solid plastic waveguide section 2230-1, 2230-2 are free of the dielectric foam tubes 2237-1, 2237-2, so that the fixture tube 2239 directly surrounds the ends of the first and the second solid plastic waveguide section 2230-1, 2230-2 and holds their face sides in place relative to each other. The fixture tube 2239 of the joint 2200-B comprises metal, which can enhance the electromagnetic coupling between the first and the second solid plastic waveguide section 2230-1, 2230-2 and can electromagnetically shield the ends of the first and the second solid plastic waveguide section 2230-1, 2230-2.

In summary, connections between fibers (e.g., solid plastic waveguide sections) can be established by fixing their ends in a proper position in front of each other. The fixture tube may include the surrounding low dielectricity foam (e.g., the dielectric foam tube) that can optionally surround the fiber and can be of any material in this case, since the dielectric foam tube can create sufficient space for the electromagnetic field that surrounds the fiber in order to avoid significant losses. Alternatively the fixture tube may be metallic and have the character of a hollow waveguide. In this case the fibers can be inserted without the foam. Mechanical clamps can be used to fix the fiber on either side of the fixture tube.

Turning back to FIG. 12a, according to some embodiments of the present disclosure, the transmit waveguide 1232 and the receive waveguide 1234 may be 5 cm long or longer, e.g. up to 1 m long, or even longer, for example up to 3 m long. They may be routed around other parts of a machine or use RF-feeds to be passed through walls of the machine, which may comprise the movable part 1210, from the shielded housing 1240 to the movable part 1210.

Moreover, the transmit waveguide 1232 and the receive waveguide 1234 may provide together with the shielded housing 1240 an electrostatic discharge protection to the radar IC 1222 as well as to the evaluation and control circuit 1224, because the transmit waveguide 1232 and the receive waveguide 1234 may not conduct direct currents (DC) as they are either made from plastic, or, in case of a metallic waveguide, the metal conductive walls of the waveguide may be DC-grounded or may be isolated from all electronic potentials of the transmit or receive electronics (e.g., the radar IC 1222, the supply circuit 1226 and the evaluation and control circuit 1224). In other words, an electrostatic discharge may neither reach the radar IC 1222 via the transmit waveguide 1232 nor via the receive waveguide 1234. Since the radar IC 1222 is surrounded by the shielded housing 1240, also alternative paths to the radar IC 1222 for electrostatic discharge may be blocked. An electrostatic discharge protection of the radar IC 1222 may be desirable, as in some embodiments the radar IC 1222 may be an unhoused integrated circuit, e.g. a bare die. An unhoused radar IC may operate at higher radio frequencies, e.g. at frequencies above 30 GHz, or even above 150 GHz, as parasitic effects, such as parasitic capacitances or parasitic inductances, of a package may be avoided for an unhoused radar IC.

The supply circuit 1226 may comprise a filter circuit, which is similar to the filter circuit 500, and may be configured to filter a supply voltage that is applied to the radar IC 1222 and to the evaluation and control circuit 1224. Consequently, as already explained above, it may be avoided, that inference signals or other spurious alternating voltages may reach the radar IC 1222 or the evaluation and control circuit 1224 via supply voltage lines.

The evaluation and control circuit 1224 may comprise a microcontroller or an application specific integrated circuit (ASIC) and may be connected to the radar IC 1222. It may be used to control the radar IC 1222, for example to control the generation and the reception of radio signals, e.g. triggering a generation of a radio signal, setting a certain radio frequency, transmit power, pulse duration, and/or pulse repetition frequency of the generated radio signal, or activating certain signal paths, e.g. a low noise amplifier or an electronic attenuator of the receiver portion of the radar IC 1222. The evaluation and control circuit 1224 may further receive a down-converted (e.g. converted to baseband or to an intermediate frequency) reflected radio signal from the receiver portion and/or the generated radio signal (at baseband or at an intermediate frequency) from the transmitter portion. The evaluation and control circuit 1224 may hence be configured to sense a position and/or a speed of the movable part 1210 based on at least the received reflected radio signal, but may also take into account the generated radio signal for this purpose. In some embodiments, the sensor apparatus 1200 may be comprised by a vehicle or a part of a vehicle. The evaluation and control circuit 1224 may then provide the sensed position and/or the sensed speed of the movable part 1210 to an Electronic Control Unit (ECU) of the vehicle.

Figure 12B:
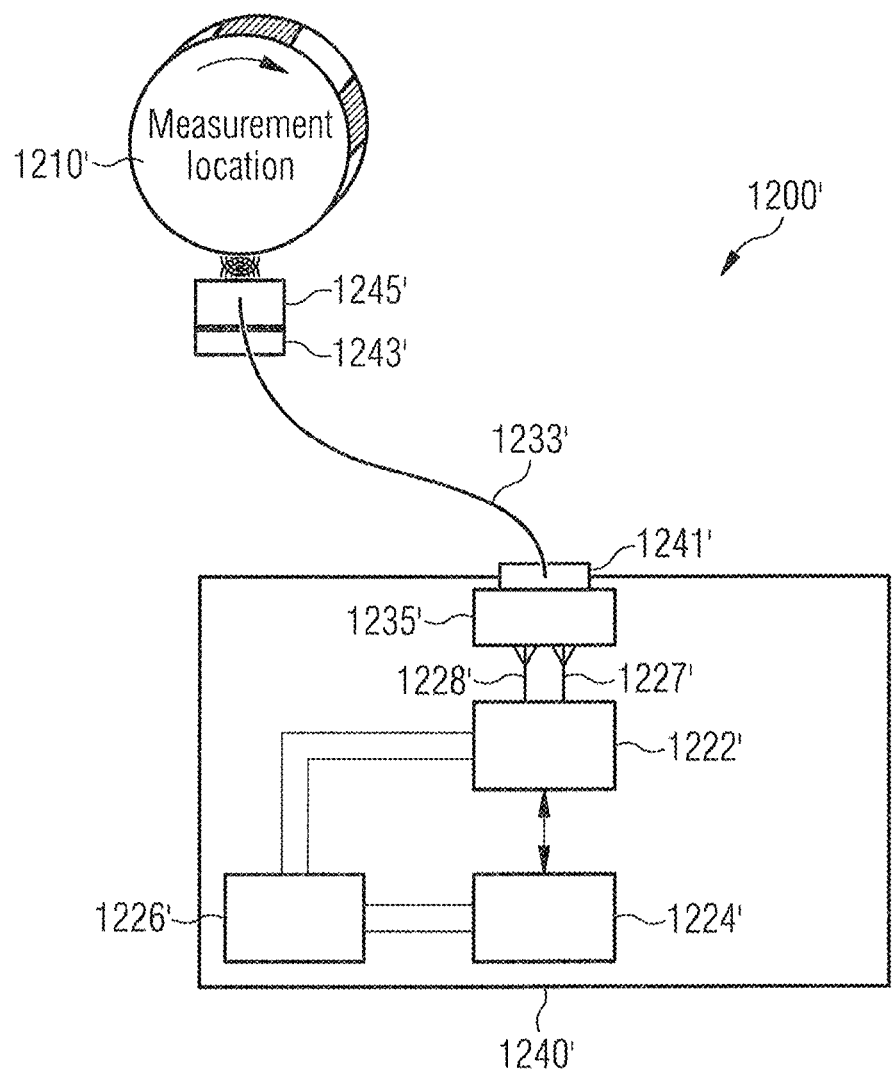

FIG. 12*b* shows another possible embodiment of a sensor apparatus 1200' for determining a position and/or a speed of a movable part 1210', herein referred to as a transceive sensor apparatus 1200', as it comprises a transceive waveguide 1233'. The transceive sensor apparatus 1200' is similar to the sensor apparatus 1200, which uses the transmit waveguide 1232 and the receive waveguide 1234.

Corresponding to the sensor apparatus 1200, the transceive sensor apparatus 1200' comprises a radar IC 1222', a supply circuit 1226', and an evaluation and control circuit 1224', which are within a protected electronic environment, e.g. in an electromagnetically shielded housing 1240'. The radar IC 1222' comprises a transmit antenna 1227' as well as a receive antenna 1228'. The transmit antenna 1227' and the receive antenna 1228' are coupled to a directive splitter 1235', which, according to some embodiments, may be similar to the directive splitter 900, as explained above. The directive splitter 1235' may be coupled via an optional connector or a feed 1241' through the shielded housing 1240' to the transceive waveguide 1233'. The transceive waveguide 1233' may be configured to guide a radio signal, generated by the radar IC 1222', to the movable part 1210', wherein the radio signal is coupled from the radar IC 1222' into the transceive waveguide 1233' via the transmit antenna 1227', the directive splitter 1235', and optionally also via a connector or feed 1241'. At the movable part 1210' the transceive waveguide 1233' may be held by a fixture 1245', such it they may face the movable part 1210', and it may optionally be connected to the fixture by a connector 1243'. In close proximity to the movable part 1210', e.g. within a distance shorter than 5 cm or, in some embodiments, even shorter than 1 cm, the transceive waveguide 1233' may emit the generated radio signal towards the movable part 1210', which may reflect the radio signal (or a part of it, e.g. a share of its energy) back to the transceive waveguide 1233'. Hence, the transceive waveguide 1233' may capture the reflected radio signal and guide it back to the radar IC 1222' via the directive splitter 1235' and the receive antenna 1228' and optionally via the connector or feed 1241'. As explained above, the evaluation and control circuit 1224' may then sense a position and/or a speed of the movable part 1210' based on at least the received reflected radio signal.

In other words, within the transceive sensor apparatus 1200' the receive waveguide may be removed. The reflected wave may be transported back by the same fiber that guides the transmitted wave towards the measurement location. The separation of the received wave from the transmitted wave may be performed by the directive splitter 1235'. This may reduce the number of waveguides from two to one.

Figure 13:
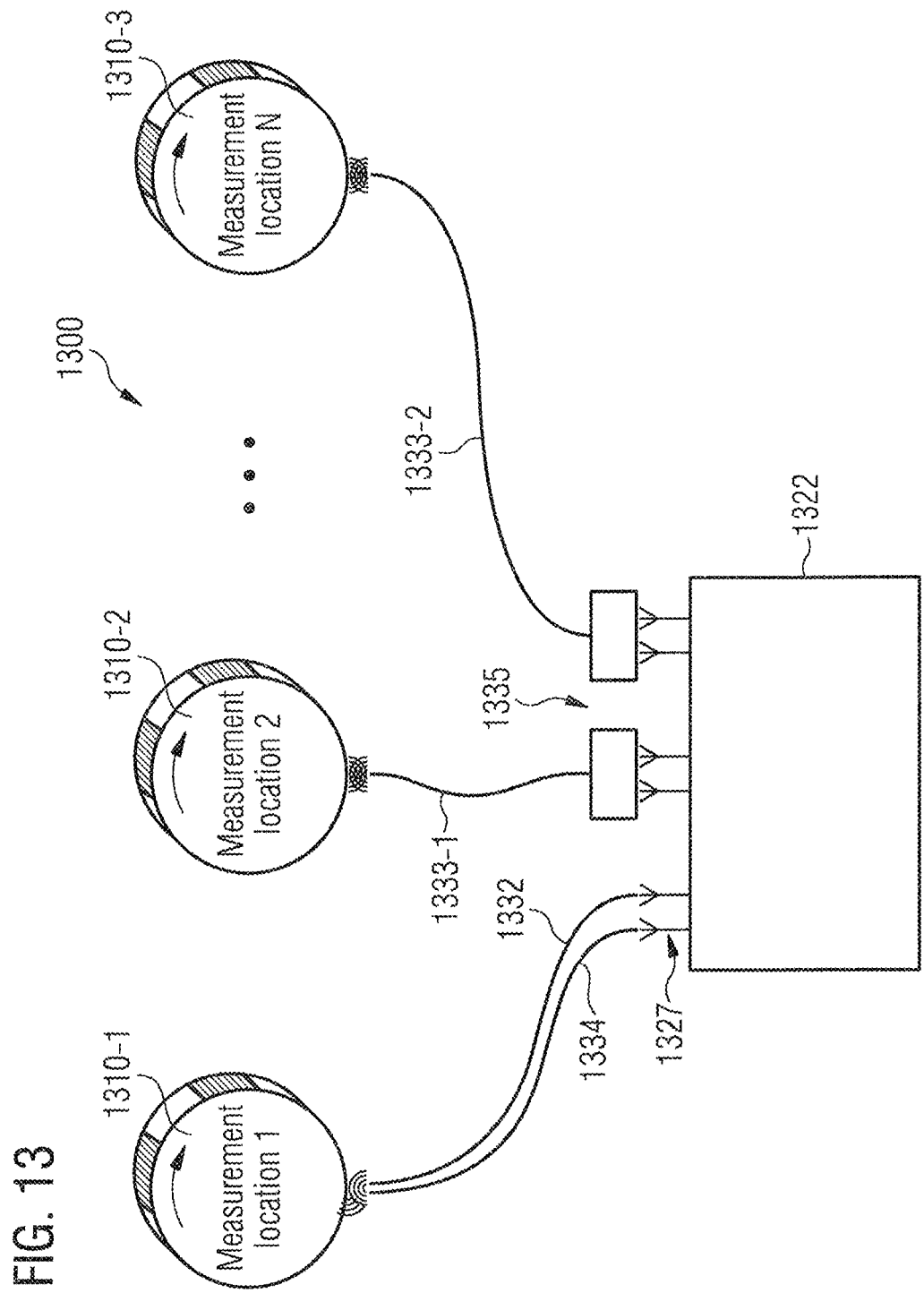
FIG. 13 shows a possible implementation of a centralized sensor apparatus for determining positions and/or speeds of several movable parts.

FIG. 13 shows a centralized sensor apparatus 1300 for determining a position and/or a speed several movable parts, e.g. a first movable part 1310-1, a second movable part 1310-2, and a third movable part 1310-3. In some embodiments, the number of movable parts, whose position and/or speed is to be determined, may also be two or exceed three. For example, there may be four, six, or ten movable parts, whose position and/or speed may be determined by a centralized sensor apparatus. The centralized sensor apparatus 1300 comprises a centralized radar IC 1322, which may be electromagnetically shielded by a shielded housing and whose supply voltages may be filtered by a filter circuit similar to the filter circuit 500 (not shown in FIG. 13).

To determine a position and/or a speed of some movable parts, e.g. for the first movable part 1310-1, the sensor apparatus 1300 may transmit a radio signal generated by the centralized radar IC 1322 via a transmit waveguide 1332 towards the first movable part 1310-1, and may receive a radio signal reflected from the first movable part 1310-1 at the centralized radar IC 1322 via a receive waveguide 1334. For determining a position and/or a speed of some other movable parts, e.g. of the second movable part 1310-2 or of the third movable part 1310-3, the sensor apparatus 1300 may transmit the generated radio signal via a transceive waveguide and receive the reflected radio signal via the same transceive waveguide. For example, the generated radio signal may be transmitted via a first transceive waveguide 1333-1 to the second movable part 1310-2, and the radio signal reflected from second movable part 1310-2 may also be guided back to the centralized radar IC 1322 by the first transceive waveguide 1333-1. For the third movable part 1310-3, the centralized radar IC 1322 may transmit a generated radio signal via a second transceive waveguide 1333-2 towards the third movable part 1310-3, and receive a reflection of the radio signal from the third movable part 1310-3 also via the second transceive waveguide 1333-2.

As shown in FIG. 13, the coupling of the generated radio signals from the centralized radar IC 1322 into the waveguides as well as the coupling of the reflected radio signals from the waveguides to the centralized radar IC 1322 may use antennas 1327, as explained above. In the case of transceive waveguides, directive splitters 1335 may be employed to separate the generated radio signal from the reflected radio signal.

According to the centralized sensor apparatus 1300, multiple speed sensors may at least partly share the same RF integrated circuit, e.g. the centralized radar IC 1322. Hence, the centralized sensor apparatus 1300 may be used in applications that require several incremental speed and/or position measurements, e.g. a transmission control, an antilock braking system (ABS), or an engine control.

A centralized radar IC may comprise several transceiver circuits. In the example of the centralized radar IC 1322, it may comprise three transceiver circuits to simultaneously determine a position and/or a speed of the first movable part 1310-1, the second movable part 1310-2, and the third movable part 1310-3. Alternatively, the centralized radar IC 1322 may comprise a single transceiver circuit. A transmitter portion of the single transceiver circuit may be switched between different transmit antennas, that are coupled to different waveguides and thus to different movable parts. Correspondingly, a receiver portion of the single transceiver circuit may be switched between different receive antennas, that are coupled to different waveguides and thus to the different movable parts. The switching between the transmit antennas as well as the switching between the receive antennas may be performed by RF switches, e.g. RF switches in CMOS technology or using pin-diodes. The RF switches may be integrated into the centralized radar IC 1322 or may be mounted onto a printed circuit board, for example the printed circuit board which also comprises the centralized radar IC 1322.

After having explained how to guide a generated radio signal from a transmitter circuit of a sensor apparatus to a movable part of a machine using a waveguide, e.g. a transmit waveguide, and how to guide a radio signal reflected from the movable part back to a receiver circuit also using a waveguide, e.g. a receive waveguide, it will now be described, how the receiver circuit (or an evaluation circuit) may determine a position and/or a speed of the movable part based on at least the received reflected radio signal.

According to some embodiments of the present disclosure, the receiver circuit may determine a position and/or a speed of the movable part based on variation of power of the received reflected radio signal and/or a phase difference between the generated radio signal and the received reflected radio signal.

FIG. 14 shows a machine 1400 comprising a movable part 1410, e.g. an encoder wheel or disc, and a radar IC, e.g. a transceiver circuit 1422 with a transmit antenna 1427, which is coupled to a transmit waveguide 1432, and a receive antenna 1428, which is coupled to a receive waveguide 1434. The second end of the transmit waveguide 1432 and the first end of the receive waveguide 1434 may be in close proximity (smaller than 5 cm or even smaller than 1 cm in some embodiments) to the movable part 1410.

In some embodiments, it may also be possible to use only one single transceive antenna and one single transceive waveguide together with a duplexer to separate transmit and receive paths. The movable part 1410 has a rotationally symmetric cross-section in the x-z plane perpendicular to its rotational axis (y-axis). Here, the face side of the second end of the transmit waveguide 1432 and the face side of the first end of the receive waveguide 1434 are positioned tangentially to the movable part 1410, such that the generated radio signal $S_t$ is reflected by an outer annular skin surface of movable part 1410 extending parallel to the rotational axis of the movable part 1410 as well as in circumferential direction of the movable part 1410.

The movable part's outer annular skin surface comprises, in circumferential direction, adjacent surface portions 1412-1, 1412-2, 1412-3, 1412-4 that are configured for alternating electromagnetic reflectivity for the radio signal $S_t$ emitted from transmit waveguide 1432. The term electromagnetic reflectivity is herein understood as a ratio of the energy of a radio signal reflected from a surface to the energy of a radio signal incident on this surface, the incident radio signal being the cause of the reflected radio signal.

A first electromagnetic reflectivity for the radio signal of the first surface portion 1412-1 differs from a second electromagnetic reflectivity for the radio signal of the adjacent second surface portion 1412-2. This may be done by using different surface materials for the adjacent surface portions, for example. For example, the first electromagnetic reflectivity may be obtained by metallization, while the second electromagnetic reflectivity may be obtained without metallization. The different electromagnetic reflectances cause or generate respective different amplitudes of the received reflected radio signal $S_r$. An electromagnetic reflectivity for the radio signal of a third surface portion 1412-3 adjacent to the second surface portion 1412-2 may correspond to the first electromagnetic reflectivity of the first surface portion 1412-1. An electromagnetic reflectivity for the radio signal of a fourth surface portion 1412-4 adjacent to the third surface portion 1412-3 may correspond to the second electromagnetic reflectivity of the second surface portion 1412-2, and so on. In this way, a periodically oscillating output signal 1423 with high and low values, e.g. voltages or bits, may be obtained upon rotation of the movable part 1410. A high output signal value may correspond to a surface portion 1412 with high electromagnetic reflectivity, while a low output signal value may correspond to a surface portion 1412 with low electromagnetic reflectivity, for example. In some embodiments, the first electromagnetic reflectivity may substantially or significantly differ from the second electromagnetic reflectivity, for example by at least 5% of the first or the second electromagnetic reflectivity. That is, a ratio between the first electromagnetic reflectivity and the second electromagnetic reflectivity may be smaller than 0.95 (or larger than 1.05). For more significant amplitude oscillations of received reflected signal $S_r$ and/or output signal 1423, the ratio between the first electromagnetic reflectivity and the second electromagnetic reflectivity may be smaller than 0.5 (or larger than 1.5), for example.

In the example of FIG. 14, the radar IC 1422 may measure the amplitude modulation/variation of the power of the receive signal $S_r$, which is reflected by the movable part 1410, e.g. by a structured target wheel. The amplitude variation is caused by the change of the reflectivity between adjacent surface portions 1412-1, 1412-2, 1412-3, 1412-4. The alternating reflectivity can e.g. be caused by metal plating on a plastic wheel. The skilled person having benefit from the present disclosure will appreciate that various other options for alternating reflectivity are possible.

FIG. 15 illustrates further example embodiments, where adjacent surface portions of movable parts are configured to cause or generate different amplitudes of the received reflected radio signal or different phase shifts between the transmitted and the received signal.

Figure 15A:
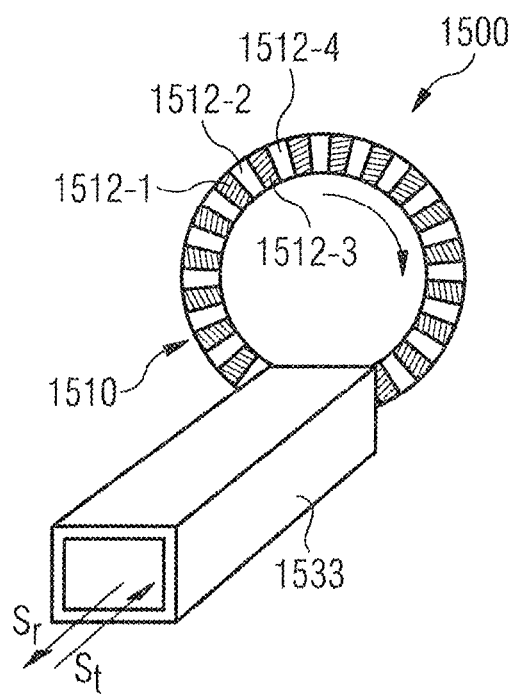
FIG. 15a, b show further examples of radio wave based sensing systems using rotationally symmetric movable parts.

FIG. 15*a* shows an annular face of a movable part 1510, such as a ring, a disc or a shaft of a machine 1500. Similar to the embodiment of FIG. 14, the movable part's annular face comprises adjacent surface portions 1512-1, 1512-2, 1512-3, 1512-4 arranged in circumferential direction that are configured for alternating electromagnetic reflectivity for a radio signal emitted from a transceive waveguide 1533. In the example of the machine 1500, the transceive waveguide is arranged in front of the movable part's annular face. Based on the x-, y-, z-coordinate system, the radio signal $S_r$ is transmitted in y-direction from the transceive waveguide 1533 to the annular face. At the same time the movable part's rotational axis also extends along y-direction. However, there may be a radial offset between the rotational axis and the position of the transceive waveguide 1533, e.g. an end of the transceive waveguide 1533. Hence, also a disc may be used as a movable part 1510 instead of a wheel and a face side of the end of the transceive waveguide 1533, e.g. an aperture of the transceive waveguide 1533 configured for emitting the radio signal and configured for receiving the radio signal reflected from the movable part 1510, may be placed in front of the disc.

Figure 15B:
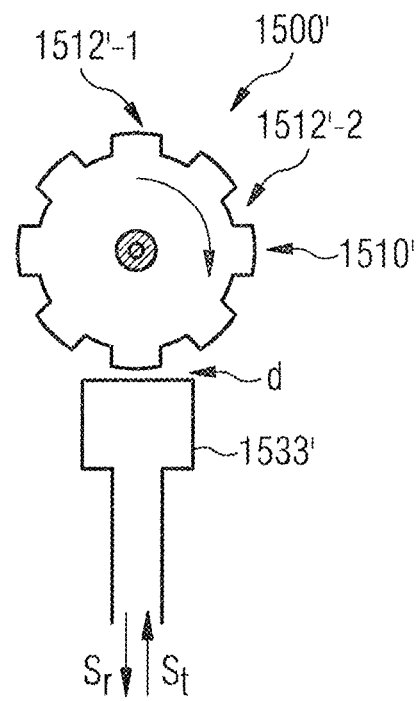

FIG. 15*b* shows an annular face or a cross section of a movable part, such as a tooth or a gear wheel 1510', comprised by a machine 1500'. The gear wheel 1510' comprises a plurality of teeth 1512'-1 separated by gaps 1512'-2 along its circumference. The gear wheel 1510' has a rotationally symmetric cross-section in the x-z plane perpendicular to its rotational axis (y-axis). A transceive waveguide 1533' is positioned radially outward from the gear wheel 1510' such that the radio signal $S_t$ is reflected by an outer skin surface of the gear wheel 1510' extending parallel to the gear wheel's rotational axis and in circumferential direction of the gear wheel 1510'. The teeth 1512'-1 and gaps 1512'-2 of the gear wheel's skin surface provide adjacent surface portions in circumferential direction that are arranged in alternating distances from the gear wheel's 1510' rotational axis. This also leads to alternating (shortest) distances between the respective adjacent surface portions 1512'-1, 1512'-2 and the transceive waveguide 1533', e.g. an aperture of the transceive waveguide 1533' configured for emitting a radio signal and configured for receiving a corresponding radio signal reflected from the gear wheel 1510'. That is to say, a shortest distance (first distance) between a first surface portion 1512'-1 of the gear wheel 1510' and the aperture of the transceive waveguide 1533' may differ from a shortest distance (second distance) between an adjacent second surface portion 1512'-2 of the gear wheel 1510' and the aperture of the transceive waveguide 1533'. The skilled person will appreciate that the first and second distances may refer to distances when a tooth 1512'-1 or a gap 1512'-2 in FIG. 15*b* directly face the aperture of the transceive waveguide 1533', respectively.

In some embodiments, the first distance may differ from the second distance by more than 5% of the first or the second distance. That is, a ratio between the first distance and the second distance may be smaller than 0.95 (or larger than 1.05). For more significant amplitude oscillations of receive signal $S_r$, the ratio between the first distance and the second distance may be smaller than 0.5 (or larger than 1.5), for example. Note that the adjacent radially offset surface portions 1512'-1 and 1512'-2 of the gear wheel 1510' may be of the same electromagnetic reflectivity. Optionally, however, they may be of different electromagnetic reflectivity for further enhancing the reflected signal's variation.

Hence, in some embodiments, a tooth wheel may be used instead of a metal printed wheel and the modulation of the reflected received radio signal power appears due to the changes of the distance instead of the change in the material reflectivity.

The person having benefit from the present disclosure will appreciate that also more complex radar principles than evaluating the amplitude/power of a received reflected radar wave could be used. For example, the distance to the reflecting object could be evaluated which is one of the classical radar measurements of a pulse radar or a Frequency Modulated Continuous Wave (FMCW) radar. This can be used to verify, if the mechanical assembly of the machine is in a proper condition. For the measurement at a tooth wheel also a Continuous Wave (CW) radar with an evaluation of the Doppler effect could be used, which would deliver a speed signal, because at the edge of an approaching tooth the surface of the target moves towards a transceive waveguide (or towards a pair of a transmit and a receive waveguide) (positive speed pulse) and at the edge of an approaching gap the surface of the target moves away from the transceive waveguide (or from the pair of the transmit and the receive waveguide) and delivers a negative speed pulse. Thus, there are various alternatives making use of different radar principles.

FIG. 16 illustrates an example of a reflected signal $S_r$ related to example embodiments for speed sensing.

The upper signal course 1610 may, for example, be obtained by down-converting a received radar signal which has been reflected by a moving (e.g., rotating) movable part with adjacent surface portions of different reflectivity. The signal down-conversion from the RF domain, which may be performed in a radar IC, may result in a potentially noisy analog or digital Intermediate Frequency (IF) or baseband radar signal 1612 with varying amplitude and/or phase. The radar signal 1612 may optionally be filtered for noise suppression or reduction. In the illustrated example, radar signal portions with higher amplitude may correspond to portions of the movable part with higher reflectivity, while signal portions with lower amplitude may correspond to portions of the movable part with lower reflectivity.

The signal course 1620 in the lower portion of FIG. 16 depicts an example of a radar sensor output signal 1622. Whenever the amplitude of radar signal 1612 surpasses a predefined signal threshold thres, an output signal pulse 1622 may be generated and sent towards an ECU, for example. Thus, in the illustrated example the rising signal edge and a predefined signal threshold are used to generate an output signal pulse, leading to a binary sensor output signal with levels 'high' and 'low'. The skilled person having benefit from the present disclosure will appreciate that also other methods of generating sensor output signals are possible. For example, also falling signal edges and/or zero crossings of signal 1612 may be used as triggers for output signal pulses.

In yet further embodiments, signal course 1610 could also represent phase differences between a reference signal and a received radar signal. Different phase differences may be indicative of different times of flight of a radar signal and thus different portions of a moving (e.g., rotating) movable part. Also in such examples sensor output signal 1622 may be generated or triggered based on exploring/extracting signal edges and/or threshold values and/or zero crossings of the phase difference signal.

In speed sensing applications, the appearance of output signal pulses 1622 (e.g. signal edges) may be synchronous with the movement of the movable object/part, e.g. signal edges of the output signal may be synchronous with the appearance of structures of the object such as reflecting structures (e.g. teeth or specific radar reflection structures mounted on the object). In other words, a signal edge corresponds to a specific structure such as the onset of a tooth etc. Thus, a number of output signal pulses within a certain time interval may be used for evaluating the speed of the movable part.

Other embodiments may additionally or alternatively employ an analysis of frequency components present in a received/reflected radar signal. Analyzing the frequency spectrum, such as, for example, a spectral spread, may also yield information on the speed of the movable part. In some embodiments, the analyzing of the radar signal to determine a rotational speed information may be performed in the radar sensor, e.g. on the same chip. In some embodiments, instead of providing output signal pulses with edges synchronous to output signal edges, an absolute value of the speed determined at the radar sensor may be communicated to a control unit, e.g. utilizing digital or analog communication interfaces.

After having described several example embodiments for speed sensing, an example will be described related to measuring the position or rotation angle. According to some embodiments, this may be achieved by providing a machine with a rotatably movable part having a rotationally asymmetric cross-section in a plane perpendicular to the movable part's rotational axis. In some embodiments, there may be a substantial rotational asymmetry. Thus, a ratio between a smallest and a largest diameter of the movable part in the plane perpendicular to its rotational axis may be smaller than 0.9 or even smaller than 0.5. A transmitter circuit is configured to transmit a radio signal towards the movable part. A receiver circuit is configured to receive a reflection of the radio signal from the movable part and to determine a rotational position and/or a rotational speed of the movable part based on at least the received radio signal reflected from rotationally asymmetric movable part.

FIG. 17 shows a setup 1700 comprising transceiver circuit 1722 with a transmit antenna 1727 coupled to a transmit waveguide 1732, and a receive antenna 1728 coupled to a receive waveguide 1734, wherein the second end of the transmit waveguide 1732 and the first end of the receive waveguide 1734 are in close proximity (smaller than 5 cm or even smaller than 1 cm in some embodiments) to a movable part 1710 having an asymmetric cross-section in a plane perpendicular to the movable part's rotational axis 1752. For example, the measured movable part 1710 may be an asymmetric shaft (e.g. camshaft or crankshaft). In the illustrated example, the movable part's cross-section is elliptic. However, other rotationally asymmetric cross-sections are possible as well. Here, the transmit waveguide 1732 and the receive waveguide 1734 are positioned radially outward from movable part 1710 such that the radio signal $S_r$ is reflected by an outer skin surface of the movable part 1710 extending parallel to the movable part's rotational axis 1752.

As indicated in the example of FIG. 17, the distance d between waveguides 1732 and 1734 and the skin surface depends on a rotational angle α of the movable part 1710. In a position, where the major semiaxis of the elliptic movable part 1710 is parallel to the z-direction (α=0), the distance d corresponds to the shortest distance between the waveguides 1732, 1734 and the skin surface of movable part 1710. In this position, the transceiver circuit 1722 will detect the largest amplitude of the reflected signal. In a position, where the major semiaxis of the elliptic movable object 1710 is parallel to the x-direction (α=π/2), the distance d corresponds to the largest distance between the waveguides 1732, 1734 and the skin surface of the movable part 1710. In this position, the transceiver circuit 1722 will detect the smallest amplitude of the reflected signal. In a further position, where the major semiaxis of the elliptic movable part 1710 is antiparallel to the z-direction (α=π), the distance d again corresponds to the largest distance between the waveguides 1732 and 1734 and the skin surface of the movable part 1710. In this position, the transceiver circuit 1722 will again detect the largest amplitude of the reflected signal, etc. Thus, it is possible to detect 180° unambiguous angular information based on the amplitude or the power of the reflected signal. Alternatively or additionally, it is also possible to detect a frequency of the amplitude variations of the oscillating reflected radio signal. This frequency is indicative of a rotational speed ω of the movable part 1710. The higher the frequency, the higher the rotational speed ω.

Figure 19:
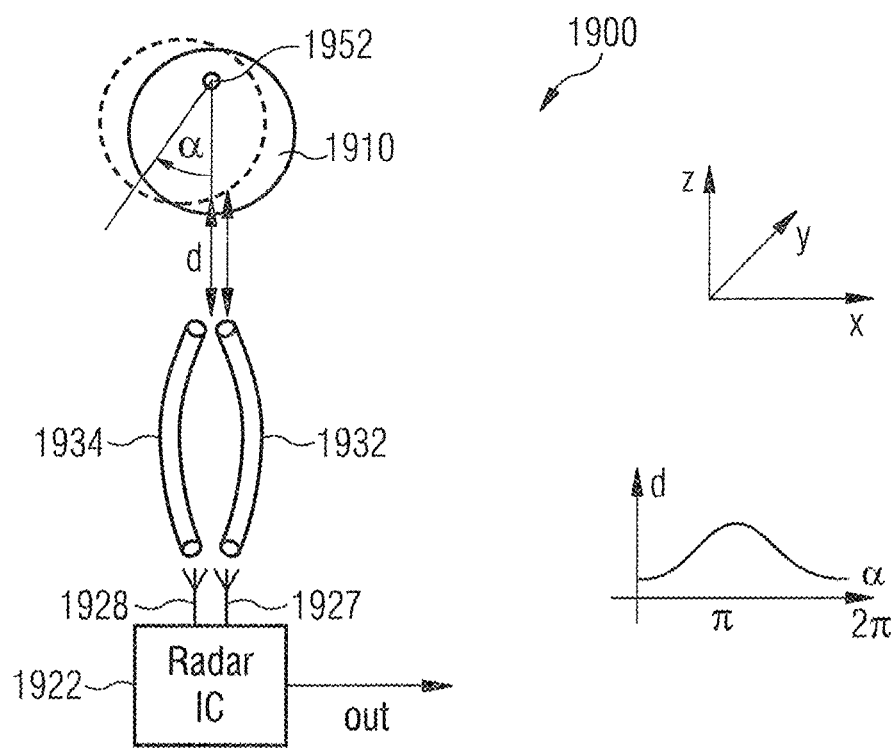
FIG. 19 shows an example of a radio wave based sensing system using a movable part having a circular cross-section with a decentered rotational axis.

FIG. 19 shows a setup 1900 comprising transceiver circuit 1922 with a transmit antenna 1927 coupled to a transmit waveguide 1932, and a receive antenna 1928 coupled to a receive waveguide 1934, wherein the second end of the transmit waveguide 1932 and the first end of the receive waveguide 1934 are in close proximity (smaller than 5 cm or even smaller than 1 cm in some embodiments) to a movable part 1910 having a circular cross-section in a plane perpendicular to the movable part's rotational axis 1952. The movable part's rotational axis 1952 is in y-direction according to the coordinate system shown in FIG. 19 and is decentered in z-direction from the center of the circular cross-section. For example, the measured movable part 1910 may be a shaft (e.g. camshaft or crankshaft). Here, the transmit waveguide 1932 and the receive waveguide 1934 are positioned radially outward from the movable part 1910 such that the radio signal $S_r$ is reflected by an outer skin surface of the movable part 1910 extending parallel to the movable part's rotational axis 1952.

As indicated in the example of FIG. 19, the distance d between waveguides 1932 and 1934 and the skin surface depends on a rotational angle α of the movable part 1910. Due to the decentered rotational axis, there is a unique position (α=0), where the distance d between skin surface of the movable part 1910 and the waveguides 1932, 1934 is minimal, e.g., corresponds to a shortest distance. In this position, the transceiver circuit 1922 will detect the largest amplitude of the reflected signal. In an opposite, unique position (α=π) the distance d corresponds to the largest distance between the waveguides 1932, 1934 and the skin surface of the movable part 1910. In this position, the transceiver circuit 1922 will detect the smallest amplitude of the reflected signal. Thus, it is possible to detect 360° unambiguous angular information based on the amplitude or the power of the reflected signal. Alternatively or additionally, it is also possible to detect a frequency of the amplitude variations of the oscillating reflected radio signal. This frequency is indicative of a rotational speed ω of the movable part 1910. The higher the frequency, the higher the rotational speed ω.

Figure 18:
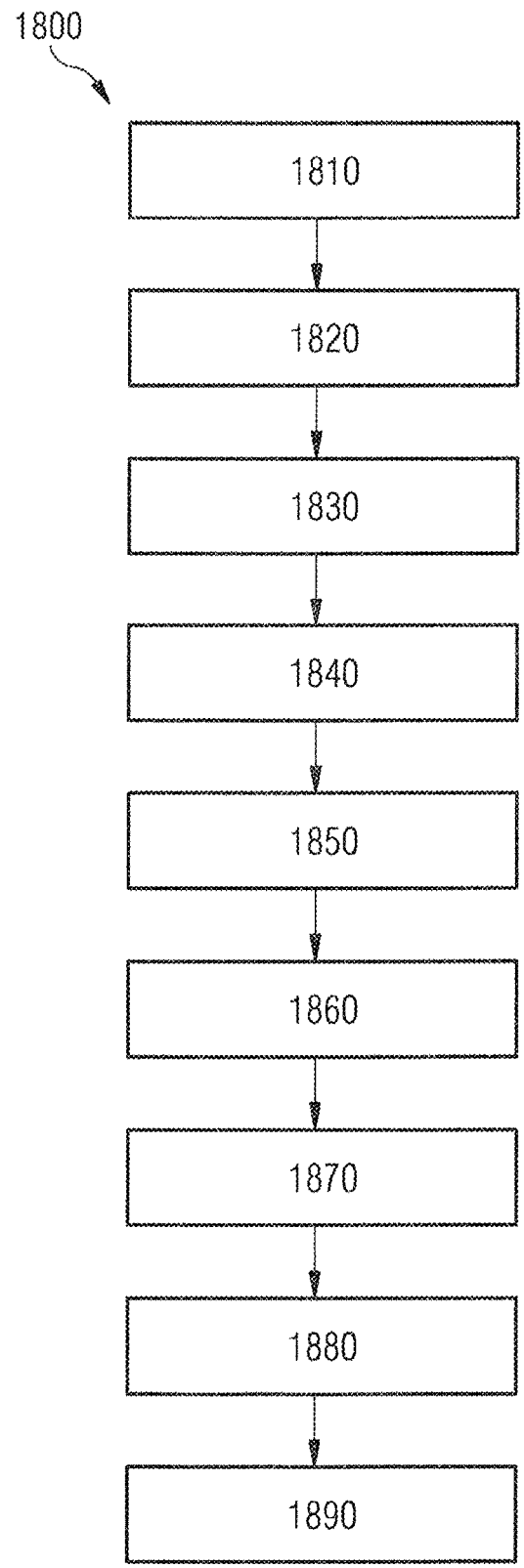
FIG. 18 illustrates a high-level flowchart of a method for position and/or a speed sensing according to an embodiment.

To summarize, embodiments implement methods for position and/or speed sensing alternative to magnetic sensor concepts. A high level flowchart of a method 1800 is shown in FIG. 18.

Method 1800 comprises generating 1810 a radio signal with a transmitter circuit and coupling 1820 the radio signal from the transmitter circuit into a transmit waveguide. Method 1800 also includes guiding 1830 the radio signal from the transmitter circuit to the movable part through the transmit waveguide and emitting 1840 the radio signal from the transmit waveguide towards the movable part. Furthermore, method 1800 comprises reflecting 1850 the radio signal from the movable part, capturing 1860 the reflected radio signal from the movable part with a receive waveguide, and guiding 1870 the reflected radio signal from the movable part to a receiver circuit through the receive waveguide. Then a coupling 1880 of the reflected radio signal out of the receive waveguide to the receiver circuit is performed by method 1800. Moreover, the method includes determining 1890 a position and/or a speed of the movable part with the receiver circuit based on at least the received reflected radio signal.

The description and drawings merely illustrate the principles of the disclosure. It will thus be appreciated that those skilled in the art will be able to devise various arrangements that, although not explicitly described or shown herein, embody the principles of the disclosure. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The invention claimed is:

1. A machine, comprising:
   a movable part;
   a transmitter circuit configured to generate a radio signal;
   a transmit waveguide coupled between the transmitter circuit and the movable part, wherein the transmit waveguide is configured separate from the transmitter circuit, the transmit waveguide being fixedly mounted and extending between the transmitter circuit and the movable part so as to guide the radio signal from the transmitter circuit to the movable part,
   wherein the movable part is configured to reflect the radio signal;
   a receiver circuit; and
   a receive waveguide coupled between the movable part and the receiver circuit, wherein the receive waveguide is configured separate from the receiver circuit, the receive waveguide being fixedly mounted and extending between the receiver circuit and the movable part so as to guide the reflected radio signal from the movable part to the receiver circuit,
   wherein the receiver circuit is configured to determine a position or a speed of the movable part based on at least the received reflected radio signal, and
   wherein adjacent surface portions of the movable part are comprised of different respective surface materials configured to provide different alternating electromagnetic reflectivity for the radio signal to enable the receiver circuit to determine the position or the speed of the movable part.

2. The machine of claim 1, wherein the transmit waveguide or the receive waveguide comprises a hollow waveguide.

3. The machine of claim 2, wherein the hollow waveguide comprises a hollow plastic waveguide comprising an air-core surrounded by a dielectric layer.

4. The machine of claim 1, wherein the transmit waveguide or the receive waveguide comprises a solid plastic waveguide.

5. The machine of claim 1, further comprising a shielded housing configured to electromagnetically shield the transmitter circuit or the receiver circuit.

6. The machine of claim 1, further comprising a filter circuit configured to filter a supply voltage from interference signals and to provide the filtered supply voltage to at least one of the transmitter circuit and the receiver circuit.

7. The machine of claim 1, wherein the transmit waveguide and the receive waveguide are routed over a distance of at least five centimeters.

8. The machine of claim 1, wherein a minimum distance between the transmit waveguide and the movable part is less than five centimeters, and
   wherein a minimum distance between the receive waveguide and the movable part is less than five centimeters.

9. The machine of claim 1, wherein the transmit waveguide and the receive waveguide are integrated in a single transceive waveguide.

10. The machine of claim 1, wherein the transmitter circuit comprises a transmit antenna configured to couple the radio signal into the transmit waveguide.

11. The machine of claim 1, wherein the receiver circuit comprises a receive antenna configured to capture the reflected radio signal from the receive waveguide.

12. The machine according to claim 9, further comprising a transceive antenna configured to couple the radio signal into the transceive waveguide and configured to capture the reflected radio signal from the transceive waveguide.

13. The machine of claim 1, wherein the transmitter circuit is coupled to a plurality of transmit waveguides, and
   wherein the receiver circuit is coupled to a plurality of receive waveguides.

14. The machine of claim 1, wherein the receiver circuit is configured to determine a position or a speed of the movable part based on variation of power of the received reflected radio signal or a phase difference between the generated radio signal and the received reflected radio signal.

15. The machine of claim 1, wherein the movable part is rotatable around a rotational axis, and
   wherein the receiver circuit is configured to determine a rotational position or a rotational speed of the movable part based on at least the received radio signal.

16. The machine of claim 15, wherein the movable part comprises a rotationally symmetric cross-section in a plane perpendicular to the rotational axis.

17. The machine of claim 1, wherein the movable part is a wheel, a tooth wheel, a disc, or a shaft.

18. The machine of claim 15, wherein the movable part comprises a rotationally asymmetric cross-section in a plane perpendicular to the rotational axis.

19. The machine of claim 1, wherein the machine is a vehicle or part of a vehicle.

20. The machine of claim 1, wherein the transmit waveguide or the receive waveguide is fed through a compartment wall of a machine housing using an RF-feed.

21. The machine of claim 1, further comprising a machine housing configured to house the moveable part, the machine housing comprising a fixture configured to receive the transmit waveguide or the receive waveguide and to direct an end of the receive waveguide towards the movable part.

22. The machine of claim 21, wherein the fixture is inserted in an opening in the machine housing and is mounted on the machine housing, wherein the receive waveguide is inserted into the fixture from outside the machine housing, and wherein an end of the fixture inside the machine housing is transparent for the radio signal.

23. A sensor apparatus, comprising:

an electromagnetically shielded integrated transceiver circuit comprising a transmitter portion configured to generate a radio signal and comprising a receiver portion;

a transmit waveguide coupled to the transmitter portion, wherein the transmit waveguide is configured separate from the transmitter portion, the transmit waveguide being fixedly mounted and extending between the transmitter portion and a movable part so as to guide the radio signal from the transmitter portion to the movable part; and a receive waveguide coupled to the receiver portion, wherein the receive waveguide is configured separate from the receiver portion, the receive waveguide being fixedly mounted and extending between the receiver portion and the movable part so to guide a radio signal reflected from the movable part to the receiver portion, wherein adjacent surface portions of the movable part are comprised of different respective surface materials configured to provide different alternating electromagnetic reflectivity for the radio signal, and wherein the receiver portion is configured to sense a position or a speed of the movable part based on at least the received reflected radio signal.

24. A method for determining a position or speed of a movable part, comprising:

generating a radio signal with a transmitter circuit;

coupling the radio signal from the transmitter circuit into a transmit waveguide while the transmit waveguide is fixedly mounted, the transmit waveguide being separate from the transmitter circuit and extending between the transmitter circuit and the movable part;

guiding the radio signal from the transmitter circuit to the movable part through the transmit waveguide;

emitting the radio signal from the transmit waveguide towards the movable part;

reflecting the radio signal from the movable part;

capturing the reflected radio signal from the movable part with a receive waveguide;

guiding the reflected radio signal from the movable part to a receiver circuit through the receive waveguide while the receive waveguide is fixedly mounted, the receive waveguide being separate from the receiver circuit and extending between the receiver circuit and the movable part;

coupling the reflected radio signal out of the receive waveguide to the receiver circuit; and determining a position or a speed of the movable part with the receiver circuit based on at least the received reflected radio signal, wherein adjacent surface portions of the movable part are comprised of different respective surface materials configured to provide different alternating electromagnetic reflectivity for the radio signal.

* * * * *